(12) United States Patent
Stacey et al.

(10) Patent No.: US 11,598,720 B2
(45) Date of Patent: Mar. 7, 2023

(54) COMPUTER-IMPLEMENTED METHOD AND SYSTEM FOR SPECTROSCOPIC ANALYSIS OF BIOLOGICAL MATERIAL

(71) Applicant: The Automation Partnership (Cambridge) Limited, Royston (GB)

(72) Inventors: Adrian Stacey, Cambridge (GB); Christian Grimm, Heiligenstadt (DE); Marek Hoehse, Göttingen (DE); Thomas Regen, Göttingen (DE); Angus Woodhams, Uckfield (GB)

(73) Assignee: The Automation Partnership (Cambridge) Limited

( * ) Notice: Subject to any disclaimer, the term of this patent is extended or adjusted under 35 U.S.C. 154(b) by 132 days.

(21) Appl. No.: 17/042,837

(22) PCT Filed: Mar. 29, 2019

(86) PCT No.: PCT/EP2019/057992
§ 371 (c)(1),
(2) Date: Sep. 28, 2020

(87) PCT Pub. No.: WO2019/185860
PCT Pub. Date: Oct. 3, 2019

(65) Prior Publication Data
US 2021/0025814 A1    Jan. 28, 2021

(30) Foreign Application Priority Data
Mar. 29, 2018  (EP) .................................... 18000314

(51) Int. Cl.
*G01N 21/05* (2006.01)
*G01N 21/359* (2014.01)
(Continued)

(52) U.S. Cl.
CPC .......... *G01N 21/359* (2013.01); *G01N 21/05* (2013.01); *G01N 35/00603* (2013.01); *G01N 35/1095* (2013.01); *G01N 2021/8416* (2013.01)

(58) Field of Classification Search
CPC ................. G01N 21/359; G01N 21/05; G01N 35/00603; G01N 35/1095;
(Continued)

(56) References Cited

U.S. PATENT DOCUMENTS 10,209,176 B2 *   2/2019  Proskurowski ........ G01N 21/01
2012/0122084 A1 * 5/2012  Wagner .................... B07C 5/34
                                                       435/6.1
(Continued)

FOREIGN PATENT DOCUMENTS

EP    1 840 577 A1    10/2007
EP    2 182 365 A2     5/2010

OTHER PUBLICATIONS

Alhusban et al., "Time-resolved pharmacological studies using automated, on-line monitoring of five parallel suspension cultures." *Scientific Reports* 7(1): 1-9, 2017.
(Continued)

*Primary Examiner* — David P Porta
*Assistant Examiner* — Djura Malevic
(74) *Attorney, Agent, or Firm* — Klarquist Sparkman, LLP

(57) ABSTRACT

A computer-implemented method for spectroscopic analysis of biological material is provided that includes analyzing samples of biological material from a plurality of sources, and delivering samples of biological material to at least one
(Continued)

flow cell for spectroscopy, and determining whether the spectroscopic analysis for each sample of the plurality of samples is or is predicted to be ambiguous in that it is affected by at least two non-discriminable factors. If such a determination is made, a disambiguating step can be performed.

15 Claims, 9 Drawing Sheets

(51) Int. Cl.
*G01N 35/00* (2006.01)
*G01N 35/10* (2006.01)
*G01N 21/84* (2006.01)

(58) Field of Classification Search
CPC ........... G01N 2021/8416; G01N 21/31; G01N 21/47; G01N 21/64; G01N 21/65
See application file for complete search history.

(56) References Cited

U.S. PATENT DOCUMENTS

2018/0246031 A1* 8/2018 Proskurowski ........ G01N 21/05
2019/0187043 A1* 6/2019 Wagner .............. G01N 15/1475
2021/0215592 A1* 7/2021 Wagner .............. G01N 15/1459

OTHER PUBLICATIONS

International Search Report and Written Opinion, dated May 22, 2019, for International Patent Application No. PCT/EP2019/057992, 18 pages.

Kansiz et al.,"Mid-infrared spectroscopy coupled to sequential injection analysis for the on-line monitoring of the acetone-butanol fermentation process," *Analytica Chimica Acta* 438(1-2): 175-186, 2001.

Tharmalingam et al.,"A framework for real-time glycosylation monitoring (RT-GM) in mammalian cell culture," *Biotechnology and Bioengineering* 112(6): 1146-1154. 2015.

Wu et al., "Micro sequential injection: fermentation monitoring of ammonia, glycerol, glucose, and free iron using the novel lab-on-valve system," *Analyst* 126(3): 291-297, 2001.

* cited by examiner

| 100uL B | 100uL B | 100uL B | 100uL B | 100uL B | 100uL B | 100uL A | 100uL A | 100uL A | 100uL A | 100uL A | 100uL A |
|---|---|---|---|---|---|---|---|---|---|---|---|
| 100uL D | 100uL D | 100uL D | 100uL D | 100uL D | 100uL D | 100uL C | 100uL C | 100uL C | 100uL C | 100uL C | 100uL C |
| 50uL A<br>50uL C | 50uL A<br>50uL C | 50uL A<br>50uL C | 50uL A<br>50uL C | 50uL A<br>50uL C | 50uL A<br>50uL C | 50uL A<br>50uL B | 50uL A<br>50uL B | 50uL A<br>50uL B | 50uL A<br>50uL B | 50uL A<br>50uL B | 50uL A<br>50uL B |
| 50uL B<br>50uL C | 50uL B<br>50uL C | 50uL B<br>50uL C | 50uL B<br>50uL C | 50uL B<br>50uL C | 50uL B<br>50uL C | 50uL A<br>50uL D | 50uL A<br>50uL D | 50uL A<br>50uL D | 50uL A<br>50uL D | 50uL A<br>50uL D | 50uL A<br>50uL D |
| 50uL C<br>50uL D | 50uL C<br>50uL D | 50uL C<br>50uL D | 50uL C<br>50uL D | 50uL C<br>50uL D | 50uL C<br>50uL D | 50uL B<br>50uL D | 50uL B<br>50uL D | 50uL B<br>50uL D | 50uL B<br>50uL D | 50uL B<br>50uL D | 50uL B<br>50uL D |
| 33uL A<br>33uL B<br>33uL D | 33uL A<br>33uL B<br>33uL D | 33uL A<br>33uL B<br>33uL D | 33uL A<br>33uL B<br>33uL D | 33uL A<br>33uL B<br>33uL D | 33uL A<br>33uL B<br>33uL D | 33uL A<br>33uL B<br>33uL C | 33uL A<br>33uL B<br>33uL C | 33uL A<br>33uL B<br>33uL C | 33uL A<br>33uL B<br>33uL C | 33uL A<br>33uL B<br>33uL C | 33uL A<br>33uL B<br>33uL C |
| 33uL B<br>33uL C<br>33uL D | 33uL B<br>33uL C<br>33uL D | 33uL B<br>33uL C<br>33uL D | 33uL B<br>33uL C<br>33uL D | 33uL B<br>33uL C<br>33uL D | 33uL B<br>33uL C<br>33uL D | 33uL A<br>33uL C<br>33uL D | 33uL A<br>33uL C<br>33uL D | 33uL A<br>33uL C<br>33uL D | 33uL A<br>33uL C<br>33uL D | 33uL A<br>33uL C<br>33uL D | 33uL A<br>33uL C<br>33uL D |
|  |  |  |  |  |  | 25uL A<br>25uL B<br>25uL C<br>25uL D | 25uL A<br>25uL B<br>25uL C<br>25uL D | 25uL A<br>25uL B<br>25uL C<br>25uL D | 25uL A<br>25uL B<br>25uL C<br>25uL D | 25uL A<br>25uL B<br>25uL C<br>25uL D | 25uL A<br>25uL B<br>25uL C<br>25uL D |

Figure 6

| | | | | | | | | | | |
|---|---|---|---|---|---|---|---|---|---|---|
| 1mL stock A | 1mL stock B | 1mL stock C | 100uL A 300uL B | 200uL A 200uL B | 300uL A 100uL B | 100uL A 300uL C | 200uL A 200uL C | 300uL A 100uL C | 1mL stock A | 1mL stock B | 1mL stock C |
| 100uL A | 100uL B | 100uL C | 100uL 1:3 A:B | 100uL 1:1 A:B | 100uL 3:1 A:B | 100uL 1:3 A:C | 100uL 1:1 A:C | 100uL 3:1 A:C | 100uL A 300uL water | 100uL B 300uL water | 100uL C 300uL water |
| 100uL A | 100uL B | 100uL C | 100uL 1:3 A:B | 100uL 1:1 A:B | 100uL 3:1 A:B | 100uL 1:3 A:C | 100uL 1:1 A:C | 100uL 3:1 A:C | 200uL A 200uL water | 200uL B 200uL water | 200uL C 200uL water |
| 100uL A | 100uL B | 100uL C | 100uL 1:3 A:B | 100uL 1:1 A:B | 100uL 3:1 A:B | 100uL 1:3 A:C | 100uL 1:1 A:C | 100uL 3:1 A:C | 100uL A 400uL water | 100uL B 400uL water | 100uL C 400uL water |
| 100uL A | 100uL B | 100uL C | 100uL 1:3 A:B | 100uL 1:1 A:B | 100uL 3:1 A:B | 100uL 1:3 A:C | 100uL 1:1 A:C | 100uL 3:1 A:C | | | |
| 100uL 1/4 A | 100uL 1/4 A | 100uL 1/4 A | 100uL 1/4 A | 100uL 1/2 A | 100uL 1/2 A | 100uL 1/2 A | 100uL 1/2 A | 100uL 1/5 A | 100uL 1/5 A | 100uL 1/5 A | 100uL 1/5 A |
| 100uL 1/4 B | 100uL 1/4 B | 100uL 1/4 B | 100uL 1/4 B | 100uL 1/2 B | 100uL 1/2 B | 100uL 1/2 B | 100uL 1/2 B | 100uL 1/5 B | 100uL 1/5 B | 100uL 1/5 B | 100uL 1/5 B |
| 100uL 1/4 C | 100uL 1/4 C | 100uL 1/4 C | 100uL 1/4 C | 100uL 1/2 C | 100uL 1/2 C | 100uL 1/2 C | 100uL 1/2 C | 100uL 1/5 C | 100uL 1/5 C | 100uL 1/5 C | 100uL 1/5 C |

Figure 7

COMPUTER-IMPLEMENTED METHOD AND SYSTEM FOR SPECTROSCOPIC ANALYSIS OF BIOLOGICAL MATERIAL

CROSS REFERENCE TO RELATED APPLICATIONS

This is the U.S. National Stage of International Application No. PCT/EP2019/057992, filed Mar. 29, 2019, which was published in English under PCT Article 21(2), which in turn claims the benefit of European Patent Application No. 18 000 314.7, filed Mar. 29, 2018. The prior applications are incorporated herein by reference in their entirety.

TECHNICAL FIELD

The following description relates to spectroscopic analysis performed on-line for a bioreactor. In particular, the description relates to a computer-implemented method and system for spectroscopic analysis of biological material.

BACKGROUND

Industrial processes, particularly biopharmaceutical processes, as well as research and development processes, increasingly involve the use of bioreactors for cultivating microorganisms under controlled conditions. Processes taking place within bioreactors involve a plurality of variables linked by complex relations, so that bioreactor monitoring and controlling are particularly challenging.

SUMMARY

It is an object of the invention to provide an effective manner of monitoring a bioreactor by means of spectroscopy in order to increase efficiency, productivity and quality of processes taking place therein. In particular, it is an object to provide an efficient calibration for spectroscopic analysis, as well as an insight into the root causes of spectra deviation. It is a further object to facilitate the reproducibility of the process even at different scales.

The achievement of this object in accordance with the invention is set out in the independent claims. Further developments of the invention are the subject matter of the dependent claims.

According to one aspect of the invention, a computer-implemented method for spectroscopic analysis of biological material is provided. The method includes an analysis step comprising:

taking, by a liquid router, a plurality of samples of biological material from a plurality of sources, wherein each sample of the plurality of samples is taken from a source of the plurality of sources;

delivering, by the liquid router, the plurality of samples of biological material to at least one flow cell for spectroscopy;

performing, by at least one spectrometer connected to the at least one flow cell, the spectroscopic analysis of the plurality of samples of biological material;

determining whether the spectroscopic analysis for each sample of the plurality of samples is or is predicted to be ambiguous in that it is affected by at least two non-discriminable factors;

if the spectroscopic analysis for a given sample of the plurality of samples of biological material is or is predicted to be ambiguous, performing a (post-analysis) disambiguating step comprising:

(a1) routing, by the liquid router, the given sample of biological material from the at least one flow cell to a manipulation station;

(b1) manipulating, at the manipulation station, the given sample of biological material in order to impact the spectroscopic analysis;

(c1) delivering, by the liquid router, the given manipulated sample of biological material from the manipulation station to the at least one flow cell;

(d1) performing, by the at least one spectrometer, the spectroscopic analysis of the given manipulated sample of biological material.

The media for a bioreactor process include biological material, i.e. material comprising a biological system, such as cells, cell components, cell products, and other molecules, as well as material derived from a biological system, such as proteins, antibodies and growth factors. Further media may include chemical compounds and various substrates. In the following, "a sample of biological material" will be used to denote a sample containing at least some biological material, which may or may not contain additional substances.

A spectroscopic analysis investigates how matter interacts with light in order to obtain information on the matter, e.g. to determine the functional groups in organic compounds or chemical composition. Accordingly, a spectroscopic analysis of biological material may provide information on the biological material, such as cell density or glucose concentration. An advantage of spectroscopic analysis is that it is a non-destructive technique. An exemplary spectroscopic technique is the Raman spectroscopy, which uses a laser light source and can identify both organic and inorganic substances in various states such as liquid, solid, emulsion and so on. Other kinds of spectroscopy include e.g. ultraviolet-visible (UV-Vis), fluorescence, near-infrared (NIR) and scattering spectroscopy.

The method comprises taking, by a liquid router, a plurality of samples of biological material from a plurality of sources of biological material. The plurality of sources may comprise a plurality of disposable bioreactors, e.g. Sartorius products like ambr®, UniVessel® and BIOSTAT STR®. Exemplarily, the sources may be given by an ambr® system, which comprises multiple single-use micro bioreactor vessels.

A bioreactor may be used for a variety of processes, such as industrial processes, particularly biopharmaceutical processes. Other examples include research and development processes or scientific research. In particular, a bioreactor process may generally comprise converting inputs or ingredients into a finished product.

Such a production process may involve chemical or microbiological conversion of material in conjunction with the transfer of mass, heat, and momentum. The process may include homogeneous or heterogeneous chemical and/or biochemical reactions. The process may comprise but is not limited to mixing, filtration, purification, centrifugation and/or cell cultivation.

Possible products may include a transformed substrate, baker's yeast, lactic acid culture, lipase, invertase, rennet. Further exemplary biopharmaceutical products that can be produced include the following: recombinant and non-recombinant proteins, vaccines, gene vectors, DNA, RNA, antibiotics, secondary metabolites, growth factors, cells for cell therapy or regenerative medicine, half-synthesized products (e.g. artificial organs).

Generally, a process occurring in a bioreactor is governed by a plurality of process parameters, e.g. temperature and stirring speed. The values of these process parameters may be specifically adjusted prior to and/or during performing the process, e.g. they can be set by an operator or by a control system. The process may be described by a series of steps.

Exemplarily, the plurality of sources may partially or in the totality be used to obtain the same product by performing variations of the same production process. In particular, the production process for a given product may be thought of as comprising some essential steps to be performed with some essential inputs, while the process parameters are constrained within boundaries determined by scientific principles and/or feasibility.

Variations of the production process may, thus, be given by one or more of the following: different values of one or more process parameters, additional optional steps, additional optional inputs. By way of further example, process variation may be produced by:
- variation in culture organism or clone;
- variation in base medium;
- changes in inoculum density or volume;
- changes in set-points e.g. temperature, pH, or profiles e.g. of temperature
- changes in feeding regime, either in terms of feed profile, or in terms of feedback control;
- changes in culture duration.

Accordingly, a variation of a given production process may be performed in each source, so that the plurality of sources correspond to a respective plurality of process variations. As an example the set point for pH might be 7.2, wherein the accuracy of the pH measurement is +−0.05. Process variations with a setpoint of 7.15 and 7.25 may be performed to cover the normal occurring variation.

Further, complex processes such as those taking place in bioreactors present intrinsic variations even if the same steps with the same process parameters are performed. This partly arises from the non-linear amplification of small variations between otherwise highly similar culture vessels or treatments. Accordingly, two or more sources may be used for nominally identical processes, which in reality are also variations of the same process due to intrinsic variations.

Each sample of the plurality of samples is taken from a source of the plurality of sources. In particular, in the context of this application, a sample may be a portion of biological material characterized by its origin, in that samples from different sources, e.g. bioreactors, are considered distinct samples, irrespectively of the specific biological material which constitutes the sample. In some examples, the biological material in two samples may be the same in the sense that it comprises the same elements, e.g. same cells and same nutrients. However, since the two samples are extracted from two bioreactors performing two different process variations (due to extrinsic or intrinsic variations), the samples are regarded as distinct. The samples of biological material are in liquid form although they may have particulates (cellular or other) in suspension.

A liquid router takes the plurality of samples of biological material from the plurality of sources. The liquid router is configured to handle liquid material, e.g. the biological material, by retrieving it, routing it and delivering it. Exemplarily, the liquids handled by the liquid router may be divided into three categories: biological materials, cleaning liquids and standard reference liquids. Standard reference liquids may include:
- analytes of interest, e.g. glucose, lactate, protein, product, viable or dead cells, diluted in water, buffer or media;
- mixes of the above, according to a Design of Experiments approach, to reduce model error from a limited number of samples;
- water, buffer or media.

Accordingly, the liquid router may comprise means for drawing off liquid, e.g. from the bioreactor or a plate well or any other liquid holder, and for dispensing liquid, e.g. to a plate well or into a waste station, such as a pipettes or syringes. Further, the liquid router may comprise means for conveying liquid from a first location to a second, different location, such as lines in connection with pumps and/or movable components such as a robotic arm. Exemplarily, the liquid router may comprise a liquid handling robot that performs automated pipetting, and the pumped lines may also be automatically controlled.

In particular, the liquid router may connect different components of a system for monitoring the bioreactors by means of an on-line analysis. Indeed, monitoring methods for process setups, such as bioreactors, and the analysers used therefore are usually classified into four categories: on-line, in-line, at-line and off-line. On-line and in-line analyses both involve a real-time, automated monitoring. In-line analyses are performed by analysers (sensors or probes or any other measuring devices) that are placed in direct connection with the bioreactor (e.g. located within or in close proximity to the bioreactor) and measure parameters (e.g. pH) that can be directly measured. On-line analyses may be considered enhanced in-line analyses comprising elaborating the measurements to interpret them and derive information. Conversely, at-line and off-line analyses involve manual intervention of operators and delayed analysis results. At-line analysers may be in a general proximity to the bioreactor, so that an operator can easily collect samples from the bioreactor and feed them to the at-line analyser. Off-line analysers may be located remotely from the bioreactor and may offer a large variety of tests at the cost of a long turn-around time.

The proposed method provides an on-line ex-situ analysis, i.e. the samples are removed from the bioreactors to be analysed. Taking the plurality of samples of biological material from the plurality of sources may be performed sequentially, i.e. one sample is taken after the other, or simultaneously, i.e. all samples are taken at the same time, or a combination of both, in the sense that groups of samples may be taken simultaneously and each group after the other sequentially. Exemplarily, the plurality of samples of biological material are taken sequentially.

In particular, the liquid router delivers the plurality of samples of biological material to at least one on-line ex-situ flow cell for spectroscopy. Exemplarily, each time a sample is taken it may be transferred from the source to a sample cup before being delivered to the flow cell. The flow cell (also called "measurement cell") comprises a body including at least one inlet through which a liquid can be introduced, at least one outlet through which the liquid can be removed and at least one optical window. An optical window is an element (e.g. a plate) that is at least partly transparent, i.e. allows at least partly passage of electromagnetic radiation in a wavelength region of interest for the spectroscopy, e.g. 190-2500 nm. Exemplarily, the electromagnetic radiation may be visible, ultraviolet and/or infrared light. The at least one optical window may comprise two plane-parallel windows of at least partially optical transmittant material (transmittance >20%) in the relevant wavelength range, e.g. 190-2500 nm. The path length between the two plane-parallel windows may be between about 10 μm and about 1 cm, in particular between about 0.1 mm and about 2 mm. An exemplary volume of a cavity in between the plane-parallel windows may be much less than 1 ml, especially between about 20 and about 200 µl.

Exemplarily, the flow cell may be designed with straight inlet and outlet in order to reduce the likelihood of clogging and it may be composed by two or more detachable parts in order to allow easy access for cleaning. The inlet and the outlet may form two channels on opposite sides of the flow cells that can be connected to tubes and may, thus, represent a bottom opening and a top opening. The diameter of the channels may e.g. be between about 0.1 and about 10 mm, in particular between about 0.1 mm and about 1.5 mm. In some examples, at least one of the inlet and outlet may be used both for introducing and removing the liquid.

Exemplarily, the flow cell may be temperature controlled, e.g. by means of a temperature sensor in combination with hot and/or cold fluids (such as via a heat exchanger, a bath circulator, etc.), at least one Peltier element and/or one or more insulation measures. Temperature control in the flow cell is advantageous, in that it ensures consistency between sample conditions and, consequently, of the resulting spectral features. In particular, a temperature-controlled flow cell spectroscopy may provide results that allow a more direct comparison with results obtained from in-vessel measurements. Indeed, in-vessel measurements are always temperature-controlled. If the flow cell measurements have to be combined with in-vessel measurements, it might be beneficial to have the same temperature in both systems and, thus, to have a temperature-controlled flow cell. Accordingly, the spectroscopic results are more suitable for a comparison to results from inline spectroscopy of other bioreactors and, therefore, data can be combined and/or compared more easily.

The flow cell may allow for simultaneous detection of several measurement modes (transmission, reflection, transflection) and various optical spectroscopies (UV-Vis, NIR, fluorescence, Raman, scattering). In particular, the applied technique is independent of flow cell design but only depends on fibre design and connected spectrometer/light sources.

The flow cell may be configured to be connected to a probe comprising an optical fibre. In particular, the flow cell may be connected to a fibre probe head including beam shaping optics and, via the probe head, to fibres connected to the probe head. Alternatively, the beam shaping optics may be integrated into the fibres and the probe head may only fixate the fibres to ensure optimal fibre positioning with regard to the flow cell. The fibre head and the flow cell may be detachably connected, e.g. by clipping. The fibre head may be either directly connected to fibres (e.g. the fibres may be glued to fibre head) or fibres may be screwed into fibre head via a coupling (e.g. via SMA coupling). Exemplarily, there may be no fibre-fibre connection inside the probe. The light of the fibre is guided by free optics into the flow cell cavity (and back).

The beam shaping optics may be contained in the probe head, while the flow cell contains no such optics. In particular, in one example, the fibre head may also enable adjustment of the focal point. Exemplarily, the probe head may be a reusable part. The flow cell may be reusable or it may also be single use. The single-use flow cell body may be made of a polymer and can be manufactured by injection molding or rapid prototyping (e.g. laser sintering or fused deposition modeling).

The liquid router may deliver the plurality of samples of biological material sequentially to the at least one flow cell, so that the plurality of samples of biological material are analysed one after the other. When handling the plurality of samples of biological material, the liquid router may take cleaning liquid from a cleaning liquid station to cleanse itself, the one or more flow cells and other system components in order to avoid contamination.

In some examples, the liquid router may deliver the at least one sample of biological material to a plurality of flow cells. The plurality of flow cells might address different modes of spectroscopy, e.g. in different wavelength regions, or different optical paths e.g. absorbance versus transmission. Different types of spectroscopy may provide orthogonal information on a sample. Exemplarily, different types of spectroscopy may be used in combination to resolve analytes that would otherwise be indistinguishable.

Exemplarily, the liquid router may deliver each sample of biological material sequentially to the plurality of flow cells, namely route a given sample of biological material to a first flow cell and, after a first spectroscopic analysis, deliver the given sample of biological material from the first flow cell to a second flow cell and, possibly, from the second flow cell to a third flow cell and so on.

Alternatively a given sample of biological material may be divided by the liquid router into two or more subsamples prior to delivery to the flow cells. Accordingly, the liquid router may deliver the given sample of biological material as split into two or more subsamples to the plurality of flow cells by routing a subsample to each flow cell. In other examples, the liquid router may perform both sequential delivery and splitting of the at least one sample of biological material, e.g. delivering the given sample of biological material to a first flow cell and, after the first spectroscopic analysis, splitting the sample into two subsamples, one of which is delivered to a second flow cell while the other is delivered to a third flow cell.

In particular, delivery to a given flow cell may modify the sample, so a second spectroscopic analysis in a second flow cell has the potential to quantify any modification of the sample.

Each sample of the plurality of samples of biological material may be delivered to all or some or only one of the plurality of flow cells. Exemplarily, all samples may be delivered to all flow cells. This may be done sequentially, in that a first sample is delivered to all flow cells (sequentially or in form of subsamples, as described above), then a second sample is delivered to all flow cells and so on, or simultaneously, e.g. a first sample is delivered to a first flow cell while a second sample is delivered to a second flow cell and then the second sample is delivered to the first flow cell while the first sample is delivered to the second flow cell. In other examples, the delivery may be partly sequential and partly simultaneous.

A method for delivering a sample to a flow cell may ensure that the sample is substantially bubble-free and, therefore, ensure acquisition of a representative sample, by reducing and/or eliminating the risk of spectral artefacts caused by gas at a gas/liquid interface. Exemplarily, one such method may be based on one or more of the following arrangements.

The flow cell may be positioned such that gravity supports filling the flow cell and/or emptying the flow cell through the inlet and/or outlet, thereby preventing air from being trapped within the flow cell, in particular between or adjacent to the one or more windows or transparent substrates through which the spectroscopic measurement is performed. In other words, the position of the flow cell may be non-horizontal, meaning that a longitudinal axis extending through the inlet/outlet channel(s) (i.e. an axis corresponding to the macroscopic direction of the fluid when it enters/leaves the flow cell) is at an angle different from 0° or 180° with reference to an axis parallel to the ground. If the inlet/outlet channel is approximately a cylindrical surface, the longitudinal axis may have the direction (i.e. be parallel to) of the generatrix of the cylindrical surface. The longitudinal axis may be positioned at an angle of about 30° to about 150°, in particular approximately in the range of about 75°-105° relating to ground level. Exemplarily, the flow cell may be positioned vertically, i.e. at an angle of about 90°.

As mentioned above, only one opening out of the two openings, the inlet and the outlet, may be used for the liquid and it may be substantially located at the bottom of the flow cell, i.e. at the surface of the flow cell closer to the ground when the flow cell is located in the automated system. In other words, the flow cell may be positioned or oriented so that its liquid opening is situated substantially facing the ground. Accordingly, the liquid of the sample may be delivered through the bottom opening when filling the flow cell, while air may be released via the other opening, e.g. a top opening. Then, the flow cell may be emptied via the bottom opening, which was also used for filling the flow cell, and while the flow cell gets emptied of the liquid, air may enter the flow cell via the top opening.

The at least one flow cell is connected to at least one spectrometer, e.g. via one or more optical fibres that guide electromagnetic radiation from the flow cell to the spectrometer. In particular, in the case of a plurality of flow cells, each flow cell is connected to one spectrometer. Indeed, for spectroscopic analysis, an electromagnetic radiation source, such as a laser, emitting in the wavelength region of interest is used to irradiate the content of the flow cell via the at least one optical window. The electromagnetic radiation after interaction with the biological material of the sample in the flow cell (e.g. scattering, absorption etc.) is guided via the optical fibre to the spectrometer. The spectrum of this electromagnetic radiation is then analysed by the spectrometer, which accordingly performs the spectroscopic analysis.

After the spectroscopic analysis for a single sample is completed, the liquid router may deliver the sample of biological material from the flow cell or one of the flow cells to a waste station for disposal. Afterwards, the liquid router may clean itself and the flow cell(s) with cleaning liquid and proceed to analyse the subsequent sample of the plurality of samples of biological material. The liquid router may comprise non-communicating parts that can be washed independently from each other. Accordingly, analysis steps for subsequent samples may partly overlap in order to increase throughput, e.g. while a first sample is in the flow cell being analysed, a second sample may be taken from a bioreactor. However same actions may be performed only sequentially, e.g. taking a first sample may not overlap with taking a second sample, and analysing a first sample may not overlap with analysing a second sample.

To summarize what explained so far, the method comprises an analysis step that, in the simplest example, may comprise taking, by the liquid router, a plurality of samples of biological material from a plurality sources and delivering them to at least one flow cell for spectroscopic analysis, which is performed by a spectrometer, and then discarding the sample in a waste station. Further, the method may comprise performing the plurality of process variations in the plurality of sources. As explained below, the plurality of process variations may be used to calibrate a spectroscopy model used for the spectroscopy analysis.

The spectroscopic analysis may provide one or more results, wherein a result is a piece of information about the analysed sample, such as a quantitative and/or qualitative determination of the content of the sample, e.g. an estimate of the properties of analytes in the sample. For example, cell concentration or glucose concentration may be determined. The information about a sample provided by the spectroscopic analysis can be used for monitoring the evolution and performance of the production process in the bioreactor from which the sample is taken.

However, spectroscopy is an indirect analytical method that requires a model to link the spectral features to results. Accordingly, a result is inferred in real time from features of the electromagnetic radiation spectrum on the basis of the model (on-line analysis). In the majority of cases, the spectroscopic analysis may be ambiguous in that it may be affected by two or more non-discriminable factors. Non-discriminable factors have the same effect on the spectrum according to the employed model, wherein the term "same" particularly should be interpreted as non-distinguishable within the given sensitivity and model accuracy. In other words, the non-discriminable factors are strongly correlated and easily confounded on the basis of the model.

In particular, the interpretation of the feature(s) of the spectrum from which a result is obtained, such as the strength of a spectral line, may frequently be affected by the at least two non-discriminable factors. Accordingly, the spectroscopic analysis may be ambiguous in the sense that it gives different results according to which factor has actually determined the given feature. In other words, the result may be e.g. a piece of information A or a piece of information B but the model used for the spectroscopic analysis cannot determine whether it is A or B.

In production processes occurring in bioreactors, such as cell cultivation, changes in one analyte are often correlated with those of a second analyte, due to mechanisms within the culture e.g. consumption of glucose by cells with concomitant production of lactate. Consequently, a model built just on samples from culture cannot typically discriminate glucose and lactate, because both are correlated with time into the process; similarly, a model built just on samples from culture cannot typically discriminate titer and viable cell density (VCD), because increases in titer and VCD are highly temporally correlated.

If the spectroscopic analysis is or suspected to be ambiguous, a disambiguating step may be performed. Conversely, if there is no ambiguity, the disambiguating step is not performed. The purpose of the disambiguating step is breaking the correlation between the at least two non-discriminable factors. It should be noted that the non-discriminable factors may comprise only factors of interest, i.e. whose features/properties (e.g. concentration) are desired to be obtained via the spectroscopic analysis, or both factors of interest and confounding factors whose features/properties are not to be obtained via the spectroscopic analysis, because they are not relevant or they can be obtained by an alternative technique in a more precise manner. For example, two non-discriminable factors may comprise two factors of interest such as glucose and lactate, or one factor of interest, glucose, and a confounding factor such as cell debris or temperature. Confounding factors may include but are not limited to temperature, pH, fluorescence, scattering, spectral background, process time.

The determination of whether the spectroscopic analysis is (or is suspected to be) ambiguous may be done on the basis of predictions and/or on the basis of the actual spectroscopic analysis.

In particular, the analysis step may comprise determining, prior to performing the spectroscopic analysis, whether the spectroscopic analysis is predicted to be ambiguous, as well as determining, after performing the spectroscopic analysis, whether the spectroscopic analysis was indeed ambiguous. Actually, the step of determining whether the spectroscopic analysis for each sample is predicted to be ambiguous may be performed at any moment with respect to the spectroscopic analysis, since it is not bound to its results, namely before or after the spectroscopic analysis. In particular, it may be performed prior to the spectroscopic analysis, e.g. prior to taking the plurality of samples.

If no ambiguity is predicted or detected, the analysis step may reduce to the simplest example discussed above. If an ambiguity is predicted before the spectroscopic analysis is performed or identified after the spectroscopic analysis has been performed, the sample may undergo a disambiguating step. The disambiguating step may take place after the spectroscopic analysis and may be referred to in the following as "post-analysis" disambiguating step. After the post-analysis disambiguating step, the sample is returned to the at least one flow cell for a second spectroscopic analysis. If the ambiguity is predicted, a disambiguating step may also be performed prior to delivering a sample to the at least one flow cell for a first spectroscopic analysis. In some examples, both a pre-analysis disambiguating step and a post-analysis disambiguating step may be performed.

The spectroscopic analysis may be predicted to be ambiguous e.g. on the basis of theoretical modelling and/or experimental data. In particular, the spectroscopic analysis may be predicted to be ambiguous based on (the particular variant of) the production process occurring in the source from which the sample is taken. For example, the determination step may amount to providing a set of instructions for automatic execution of the analysis step which includes the disambiguating step from the outset. Alternatively, there may be one or more control flags associated with the production process in general or with particular characteristics of the process in a given source, wherein a control flag indicates a possible or certain ambiguity. E.g., the flag may be 0 if the risk of ambiguity is predicted to be null or negligible (such as lower than a specific, predetermined or predeterminable threshold) and 1 if the risk of ambiguity is substantial (such as higher than a specific, predetermined or predeterminable threshold). If at least one control flag indicates ambiguity, the disambiguating step particularly is performed. The one or more control flags related to the process may be (automatically) checked at any moment prior to the spectroscopic analysis, as well as after the spectroscopic analysis. When the spectroscopic analysis is predicted to be ambiguous, the disambiguating step may be a pre-analysis disambiguating step or a post-analysis disambiguating step. In a particular example, it is a post-analysis disambiguating step.

The spectroscopic analysis may be found to be ambiguous after it has been performed, i.e. on the basis of the actual spectroscopic analysis. Exemplarily, the one or more results of the spectroscopic analysis may be provided in such a way that ambiguity is indicated (e.g. presence of specific symbols such as '?' or low levels of confidence for certain results). Based on the indication in the results, the disambiguating step may be performed. When the spectroscopic analysis is found to be ambiguous, the disambiguating step is a post-analysis disambiguating step.

While, when the ambiguity is predicted, the nature of the disambiguating step may be fixed, in the sense that is determined a priori how the sample is to be manipulated, determining the ambiguity on the basis of the actual results may allow for a modulation "on the fly" of the manipulation procedure or even of the production process to which the sample refers to.

Generally, the disambiguating step may comprise routing the sample of biological material for which an ambiguity has been determined (predicted or identified) to a manipulation station. In a pre-analysis disambiguating step, the sample of biological material may be transferred from the source to the manipulation station. In a post-analysis disambiguating step, the liquid router may transfer the sample from the flow cell back to the sample cup and from there to the manipulation station. Accordingly, a post-analysis disambiguating step may comprise: routing, by the liquid router, the given sample of biological material from the at least one flow cell to a manipulation station; manipulating, at the manipulation station, the given sample of biological material in order to impact the spectroscopic analysis; delivering, by the liquid router, the given manipulated sample of biological material from the manipulation station to the at least one flow cell; performing, by the at least one spectrometer, the spectroscopic analysis of the given manipulated sample of biological material. A pre-analysis disambiguating step may comprise: routing, by the liquid router, the given sample of biological material from the source to the manipulation station; manipulating, at the manipulation station, the given sample of biological material in order to impact the spectroscopic analysis; delivering, by the liquid router, the given manipulated sample of biological material from the manipulation station to at least one flow cell; performing, by at least one spectrometer connected to the at least one flow cell, the spectroscopic analysis of the given manipulated sample of biological material.

Exemplarily, the disambiguating step may be performed on a different sample from the same source of biological material of the sample for which an ambiguity is determined (predicted or identified). Accordingly, after determining whether the spectroscopic analysis for a sample is or is predicted to be ambiguous, the disambiguating step may comprise one or more of the following:

(a2) taking, by the liquid router, a secondary sample from the same source of the given sample for which the spectroscopic analysis is or is predicted to be ambiguous;

(b2) routing, by the liquid router, the secondary sample of biological material from the source to a manipulation station;

(c2) manipulating, at the manipulation station, the secondary sample of biological material in order to impact the spectroscopic analysis;

(d2) delivering, by the liquid router, the manipulated secondary sample of biological material from the manipulation station to the at least one flow cell; and (e2) performing, by the at least one spectrometer, the spectroscopic analysis of the manipulated secondary sample of biological material.

Thus, the secondary sample is or may be taken for the purpose of disambiguation and may be directly transferred by the liquid router from the source of biological material to a manipulation station without performing a spectroscopy measurement first. As explained above, a sample is characterized by its origin, so that two samples from the same bioreactor can be considered equally "ambiguous" in terms of a spectroscopic analysis. The information obtained via the disambiguating step with the secondary sample may then be used for the spectroscopic analysis of the original sample. The use of a secondary sample may be advantageous, in that the secondary sample is out of the bioreactor for a shorter amount of time in comparison to a sample that has already undergone a spectroscopic analysis, and thus has aged less. It may also reduce/eliminate possible modifications of the sample due to delivery through the system. Further, using a secondary sample simplifies the liquid handling and the automation of the process.

The manipulation station may be a location within the system at which at least one liquid container for holding the sample during the manipulation is found and means for the manipulation are employed. In particular, means for the manipulation may comprise tools, e.g. heating/cooling device for modifying temperature, and/or substances, such as water for diluting or an acid for modifying the pH. The means for manipulation may be located at the manipulation station or may be moved thereto, e.g. the substances may be stored at a storage station and be routed by the liquid router to the manipulation station. The liquid router itself may at least partly perform manipulation of the sample.

Generally, at the manipulation station, the sample may undergo physical, chemical and/or biological modifications. As discussed below, a sample of biological material may be manipulated at a manipulation station for different purposes. During the disambiguating step, the aim of the manipulation is to impact the spectroscopic analysis in order to try and break the correlation between the at least two non-discriminable factors. In some cases, the manipulation leads to a modification of the spectrum. In other cases, the manipulation has no effect on the spectrum. Both the presence and the absence of an effect may help break the correlation. As already mentioned, the correlation to be broken may be between factors of interest or factors of interest and confounding factors.

Exemplarily, manipulating the sample may comprise mixing the sample with a disambiguating substance, which is also known as "spiking". The liquid router may draw the disambiguating substance from a source thereof and inject it into the at least one liquid container. The disambiguating substance may or may not correspond to one of the non-discriminable factors. For example, if the analyte of interest is lactate, the sample may be spiked with glucose or lactate. Other examples include spiking with water, with cells, with cell debris and/or with ions.

It is possible for there to be more than one component which gives rise to the need for disambiguation, and this multi-component disambiguation may be achieved using a mixture of disambiguating substances.

In a particular example, manipulating may further comprise dividing the given sample of biological material in a plurality of subsamples and each subsample is mixed with a different amount of the disambiguating substance and/or multiple disambiguating substances. Accordingly, delivering the given manipulated sample may comprise delivering the plurality of manipulated subsamples; and performing the spectroscopic analysis of the given manipulated sample may comprise performing the spectroscopic analysis of the plurality of manipulated subsamples.

Exemplarily, the at least one liquid container of the manipulation station may comprise a plate with a plurality of wells. In particular, at the manipulation station, the sample of biological material may be divided by the liquid router into a plurality of subsamples or aliquots, one contained in each well. The liquid router may also deliver one or more substances for spiking the wells, wherein this step may take place before or after the subsamples are placed into the wells. In particular, each subsample may be differently manipulated, e.g. using different amounts of the disambiguating substance or substances.

Accordingly, a result of the manipulation may be a plurality of differently manipulated subsamples, which may be sent sequentially to the flow cell for spectroscopic analysis. Each manipulated subsample may be analysed and the information obtained from each spectroscopic analysis may be used to break the correlation.

Manipulations other than spiking may include e.g. warming or cooling the sample, removing cell or cell debris from the sample, changing pH of the sample and/or changing ionic strength of the samples.

If there is a plurality of flow cells, and the spectroscopic analysis for more than one flow cell is or is predicted to be ambiguous, a disambiguating step may be performed for each flow cell. Further, results from one flow cell may be used to disambiguate results obtained from another flow cell.

To summarize, at least one disambiguating step may be performed for each sample of the plurality of samples of biological material whose spectroscopic analysis is or is predicted to be ambiguous. It should be noted that the described manipulation of the sample for impacting the spectroscopic analysis may have a two-fold purpose: on one hand it allows to provide a result about the analysed sample and on the other hand it allows a calibration of the model. Indeed, since a controlled manipulation of the sample is performed, the sensitivity of the spectral component(s) to a plurality of factors can be accurately studied. In other words, the calibration of the model in which certain properties of the sample are identified as causes of certain features in the spectrum is made possible.

In view of the plurality of sources with process variations and the countless possibilities for manipulating the analytes in the samples, an accurate and refined calibration is possible, in which spectral deviations can be linked to process/analyte changes. The process variations carried out in the source of biological material and the manipulation of the samples may be organically considered as part of a procedure for automatic calibration for spectroscopic analysis. Accordingly, the method for spectroscopic analysis is both a method for performing spectroscopic analysis based on a model and obtain information about a sample and a method for calibrating a model used in the spectroscopic analysis. In particular, in some cases, the manipulation of the sample and the process variations may serve more the function of introducing confounding factors to ensure model robustness, than discriminating two analytes of interest, as mentioned above.

As mentioned previously, even in a case in which no disambiguating step is performed, the fact that a plurality of process variations is carried out in a plurality of sources of biological material may alone provide a calibration of the model for spectroscopic analysis.

In certain circumstances, e.g. if there are more than two non-discriminable factors, the disambiguating step may be repeated one or more times. Accordingly, the sample may move from the flow cell to the manipulation station and back to the flow cell, to be then brought again to the manipulation station and once again to the flow cell, and so on.

In a particular example, at least one of the plurality of samples of biological material may undergo pre-processing prior to the spectroscopic analysis. Accordingly, the analysis step may further comprise:

pre-processing at least one sample of the plurality of samples of biological material prior to performing the spectroscopic analysis, in particular by at least one of: filtering, heating, normalizing pH, modifying ionic strength, diluting, metabolic inactivation.

The pre-processing is none other than a form of manipulation of the sample as described above. Accordingly, sample pre-processing may include manipulating the at least one sample of biological material in order to physically, chemically and/or biologically alter it. Unlike in the disambiguating step, the aim of the manipulation in this case is preparing and/or stabilizing the sample for spectroscopic analysis. Preparation of a sample for analysis might involve the physical removal of otherwise confounding factors. Stabilization of a sample for analysis might involve the inactivation of sample change, to prevent or diminish change in the sample whilst spectral data are being captured.

For example, sample pre-processing may comprise but is not limited to: filtering or settling to remove particulates, modifying concentration (e.g. of proteins), metabolic inactivation, mixing, cooling, heating, normalizing pH, modifying ionic strength, diluting or any combination thereof. Filtering or settling may be used to distinguish spectra with and without cells and therefore reflect the spectral properties of the media relative to that of the cells and the media. Metabolic inactivation may be used to diminish sample change over time, particularly in the case of long (e.g. 15 min) spectral collection.

As already mentioned, sample pre-processing and sample manipulation for disambiguation may involve, at least partly, the same procedures. For example, diluting the sample with water may be done for pre-processing and for disambiguation. Further, in some examples, sample pre-processing may also comprise dividing the sample into a plurality of subsamples, as described above. In particular, a plate with wells may also be used for pre-processing.

When a pre-analysis disambiguating step is performed, the pre-processing may take place before, after or together with the pre-analysis disambiguating step. The pre-processing may occur at the same manipulation station used for the disambiguating step or at a different manipulation station. In any case, the liquid router may first route the at least one sample of biological material to the one or more manipulation stations for pre-processing and pre-analysis disambiguating step and then route the at least one sample of biological material from the (last) manipulation station to the flow cell.

In another particular example, in addition to the on-line spectroscopic analysis, a reference analysis, specifically an off-line, at- or on-line reference analysis may be performed, which provides a means of measuring the analytes of interest, for which the spectroscopic analysis provides model-based estimates. Exemplarily, more than one reference analysis may be performed.

In the case of at- or off-line reference analysis, the method may further comprise: taking, by the liquid router, a subsample of at least one sample of the plurality of samples of biological material; delivering, by the liquid router, the subsample to a transfer container for transfer to an at- or off-line reference system; performing, by the off-line reference system, an at- or off-line reference analysis of the subsample; comparing at least one result of the spectroscopic analysis by the spectrometer for the at least one sample of biological material with at least one result of the at- or off-line reference analysis. In the following, an off-line reference system is discussed, but the same principles apply for an at-line reference system.

The liquid router may take a subsample out of a sample of biological material, wherein the subsample is then transported to the off-line reference system and the rest of the sample is routed to the at least one flow cell. Said in different terms, a sample of biological material may be split into two subsamples, one of which is delivered to the flow cell(s) while the other is sent to the off-line reference system. In particular, the sample of biological material may be delivered to a transfer container for transfer to the off-line reference system and the transfer container may be manually brought to the off-line reference system.

The delivery to the transfer container may occur only before, only after or before and after delivery to the at least one flow cell. If the delivery occurs before, the sample of biological material may be transported by the liquid router from one source to the container for transfer and then an aliquot may be taken from the container for delivery to the at least one flow cell. If the delivery occurs after, the sample of biological material may be transported by the liquid router back from the flow cell to the sample cup and then to the transfer container. In this way, the state of the (sub) sample for spectroscopic analysis is as similar as possible to the state of the (sub)sample used for the reference analysis. Accordingly, the timing of the reference analysis may be coordinated with the timing of the spectroscopic analysis, so that they are performed simultaneously. In this case, the result(s) of the spectroscopic analysis and the result(s) of the off-line reference analysis may be directly compared.

If the delivery to the transfer container occurs before and after delivery to the at least one flow cell, it may be possible to evaluate and account for a potential temporal change in the biological material. In particular, a first off-line reference analysis may be performed at a point in time antecedent to the point in time at which the spectroscopic analysis is performed and a second off-line reference analysis may be performed at a point in time following the point in time at which the spectroscopic analysis is performed. The result(s) of the first off-line reference analysis and the result(s) of the second off-line reference analysis may be interpolated to obtain corresponding information at the time point of the spectroscopic analysis, which can then be compared to the result(s) thereof.

If a pre-analysis disambiguating step or post-analysis disambiguating step is performed, the subsample sent to the off-line reference system may be taken from the manipulated sample or from the non-manipulated sample. In the latter case, corrections for the manipulation may be made to the results of the off-line reference analysis.

The off-line reference system may be a measuring device configured to measure at least one property of at least one analyte of interest e.g. YSI glucose analyser, Nova Flex II, Cedex Cell Counter, ViCell Cell Counter, an HPLC system, or a flow cytometer.

The measurement obtained thanks to the off-line reference system for a given property (e.g. glucose concentration) may be compared to the estimate for that same property provided by the spectroscopic analysis by a computing device. This may be critical to calibrate the on-line analysis of the flow cell plus spectrometer. In particular, the model used in the spectroscopic analysis may be adjusted so that there is a match between the result(s) of the off-line reference analysis and of the spectroscopic analysis.

In some examples, a plurality of off-line reference systems may be used for measuring different properties. Accordingly, a plurality of subsamples may be drawn for the plurality of off-line reference systems.

In the case of an on-line reference analysis, the method may further comprise: taking, by the liquid router, a subsample of at least one sample of the plurality of samples of biological material; delivering, by the liquid router, the subsample to an on-line reference system; performing, by the on-line reference system, an on-line reference analysis of the subsample; comparing at least one result of the spectroscopic analysis by the spectrometer for the at least one sample of biological material with at least one result of the on-line reference analysis. Accordingly, the only difference with an off-line reference system is that the liquid router may deliver the subsample directly to the on-line reference system instead of the transfer container. Thus, what discussed above with regard to the off-line reference analysis applies mutatis mutandis for an on-line reference system, in particular the reference analysis may be performed prior to, at the same time as and/or after the spectroscopic analysis.

In a particular example, the analysis step may be further performed one or more additional times at different time points, and the method may further comprise determining a time-based profile of results of the spectroscopic analysis. The time-based profile may also be referred to as "trajectory".

In particular, the results of the spectroscopic analysis may provide information on process parameters and/or analytes properties at the different times during the evolution of the process. Accordingly, a plurality of trajectories may be obtained corresponding to a plurality of process parameters/ analyte properties as evolved when performing the process at a given scale. Exemplarily, the plurality of sources may operate at a small scale. A scale particularly refers to a configuration, e.g. a size of a setup used for executing the production process, wherein the configuration determines, among others, the throughput and the costs of the production process. Exemplarily, for a production process executed with a bioreactor, the scale value may refer to the volume of the bioreactors, wherein a small scale in this case may be 15 mL or 250 mL.

Each trajectory may be implemented as a curve or graph that describes the time evolution of a quantity during the execution of the production process. The one or more trajectories may be used when scaling up the production process. For example, the trajectories may be transferred to a larger scale (e.g. 2 L, 50 L, 200 L or 2000 L) and used for comparison. In this case, an optically similar spectrometry system attached to the larger scale would be used to capture spectral data; multivariate data analyses would be used to extract, from the small and large scale systems, features of the spectral data (e.g. principal components from principal component analysis) that describe the bulk of the temporal variability; at the large scale, these features can then be compared with the variation observed in the same features at the small scale, and thereby identify deviations from the typical behaviour of the process, for example, due to a contamination event.

According to another aspect of the invention, a system for automatic spectroscopic analysis of biological material is provided. The system comprises:
  a plurality of sources of biological material;
  a liquid router;
  at least one flow cell for spectroscopy;
  a manipulation station;
  an interface device;
  wherein:
  the interface device is configured to receive instructions for automatically controlling operations of the system;
  the liquid router is configured to take a plurality of samples of biological material from the plurality of sources, wherein each sample of the plurality of samples is taken from a source of the plurality of sources, and to deliver the plurality of samples of biological material to the at least one flow cell;
  the at least one flow cell is configured to be connected to at least one spectrometer; and when a spectroscopic analysis of a given sample of the plurality of samples of biological material by the at least one spectrometer is or is predicted to be ambiguous in that the spectroscopic analysis is affected by at least two non-discriminable factors, the liquid router is further configured to:
  (a1) route the given sample of biological material from the at least one flow cell to the manipulation station, wherein the manipulation station is configured so that the given sample of biological material is manipulated in order to impact the spectroscopic analysis; and
  (b1) deliver the given manipulated sample of biological material from the manipulation station to the at least one flow cell; or.
  the liquid router alternatively is further configured to:
  (a2) take a secondary sample of biological material from the same source of the given sample for which the spectroscopic analysis is or is predicted to be ambiguous;
  (b2) route the secondary sample of biological material from the source to a manipulation station, wherein the manipulation station is configured so that the secondary sample of biological material is manipulated in order to impact the spectroscopic analysis; and
  (c2) deliver the manipulated secondary sample of biological material from the manipulation station to the at least one flow cell.

In some examples, the system may comprise more than one manipulation station. The system may further comprise storage stations in which components such as cleaning liquid and substances for manipulation are stored. Additionally, the system may comprise a waste station for disposal of samples. Further, the system may comprise one or more on- or at-line reference systems.

The system is configured to autonomously and automatically perform the method described above. In the system, the plurality of sources are complemented by an on-line analysis module, comprising the flow cell(s) connected to the spectrometer(s), and one or more manipulation stations. A liquid router connects the different components of the system. Accordingly, the system can autonomously perform a set of production processes (e.g. cell cultivations), material manipulations and spectral captures.

The system may be controlled by a control computer via the interface device, which receives instructions from the control computer for automatically controlling operations of the system. In particular, the liquid router as well as potential manipulation tools may be controlled via the interface device. The liquid router and the manipulation tools may comprise robotic components that perform actions on the basis of received instructions. The spectrometer(s) connected to the flow cell(s) may also be controlled by the same control computer, directly or indirectly by means of a "slave" spectrometer control computer. The control computer may be in communication with the computing device configured to configured to compare results of the spectroscopic analysis with results of the off-line reference analysis.

In particular, the steps of the method may form a protocol defining all procedures that occur within the system, including (the variations of) the production process performed in the plurality of sources of biological material and the analysis step (with disambiguating step). This protocol may be written in the form of computer instructions that can be received by the interface device and forwarded to the components of the system that automatically execute the instructions without user interaction. In particular, these may be the robotic components of the liquid router, such as the liquid handling robot, and the manipulation tools, as well as robotic elements in the bioreactors responsible for performing (the variations of) the production process, e.g. cell cultivation.

The invention does not only allow for automated process execution and data acquisition but also for on-line data evaluation. The spectrum of a given sample is automatically linked to the specific source, i.e. bioreactor, and sampling time as well to the corresponding reference values from the reference system, when present.

To summarize, the computer-implemented method described above particularly allows for a spectroscopic analysis executable in an automated fashion by a robotic system. The analysis is performed on-line and ex-situ, particularly with the possibility of moving the sample back and forth between the flow cell(s) and the manipulation station(s), as well as from and to a reference system. The automatized protocol specifically can control production processes in the bioreactors and/or sampling procedures for spectroscopic analysis and/or reference analysis, including pre-processing and disambiguating manipulation of the samples.

In particular, the combination of process variations and manipulation of the samples allows a comprehensive automated calibration of the spectroscopic analysis. Indeed, the invention particularly allows for automated multi-parallel cultivations with deliberately induced process/parameter variations. Consequently, automated sampling manipulation and spectral measurements allow for an automated root cause analysis. As an outcome, spectral deviations can be linked to process/analyte changes, thus enabling process control on the basis of spectroscopy, instead of pure monitoring of spectral deviations.

BRIEF DESCRIPTION OF THE DRAWINGS

Details of exemplary embodiments are set forth below with reference to the exemplary drawings. Other features will be apparent from the description, the drawings, and from the claims. It should be understood, however, that even though embodiments are separately described, single features of different embodiments may be combined to further embodiments.

FIG. 6 shows an exemplary spiking plate.

FIG. 7 shows an exemplary preparation of a spiking plate.

DETAILED DESCRIPTION

In the following, a detailed description of examples will be given with reference to the drawings. It should be understood that various modifications to the examples may be made. Unless explicitly indicated otherwise, elements of one example may be combined and used in other examples to form new examples.

Figure 1:
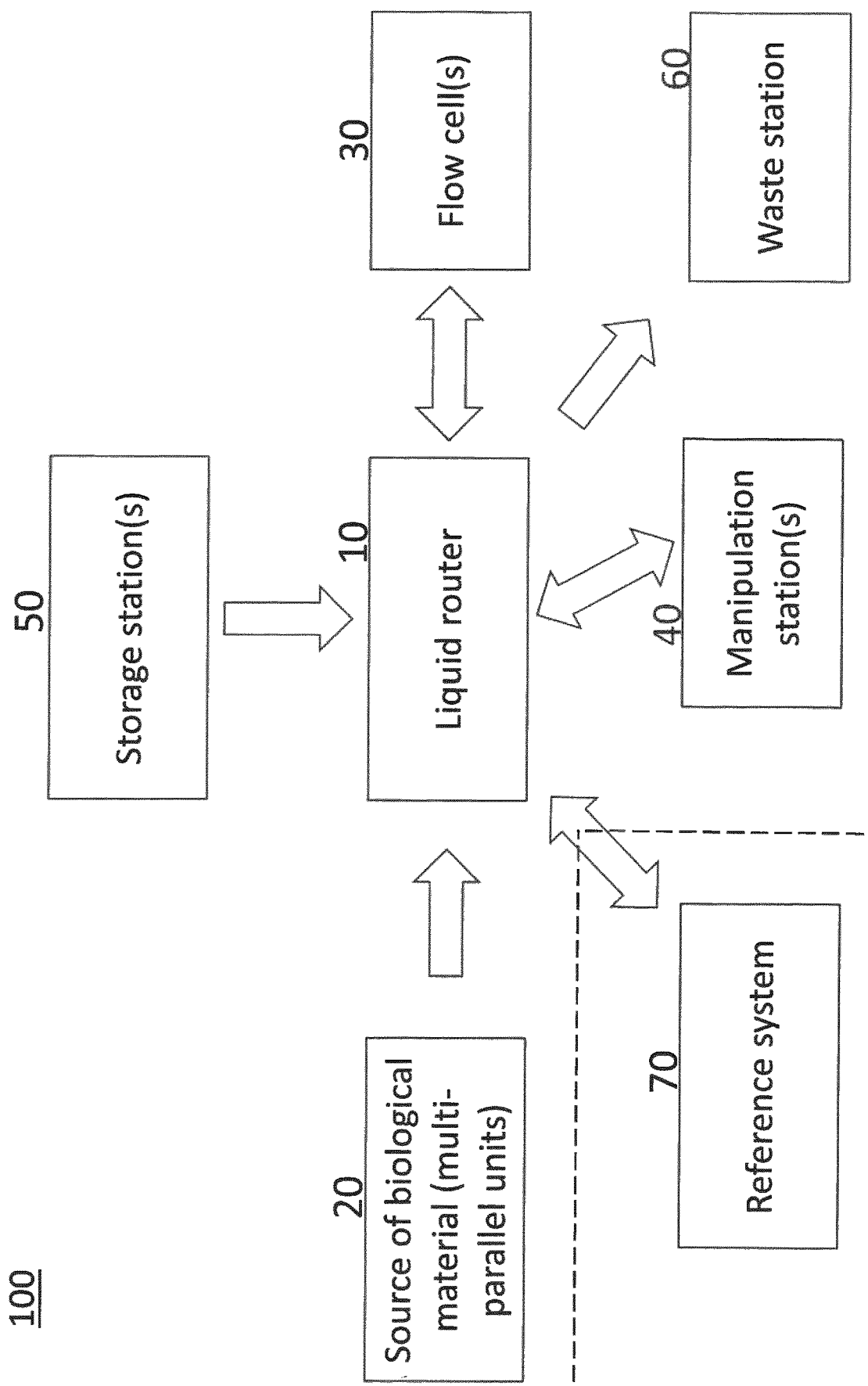
FIG. 1 shows a block diagram of an automated system for spectroscopic analysis of biological material.

FIG. 1 shows a block diagram of an automated system 100 for spectroscopic analysis of biological material. The various components of the automated system 100 are linked among themselves via the liquid router 10, in the sense that the liquid router may convey liquid across different locations in the system. The automated system 100 comprises the following components: a plurality of sources of biological material 20, one or more flow cells 30 for spectroscopy, a manipulation station 40, storage stations 50 and a waste station 60. Although a case with one manipulation station 40 will be described, the automated system 100 may comprise a plurality of manipulation stations 40.

Figure 2:
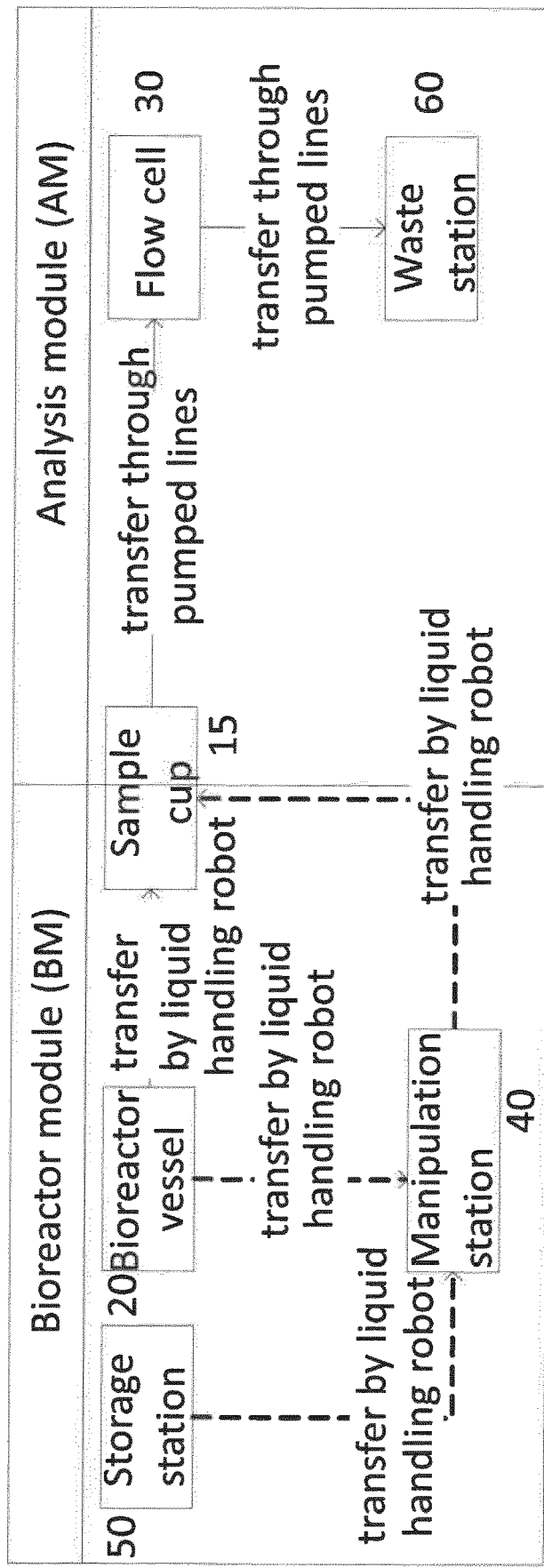
FIG. 2 shows another block diagram of an automated system for spectroscopic analysis of biological material.

FIG. 2 shows another block diagram of the automated system 100 for spectroscopic analysis of biological material, wherein a schematic spatial distribution of the components is illustrated.

The automated system 100 may be considered as comprising a bioreactor module and an analysis module. The bioreactor module comprises the plurality of bioreactor units 20, the manipulation station 40 and the storage stations 50, i.e. it is the part of the automated system 100 in which the samples are generated and manipulated. The analysis module comprises the flow cell(s) 30 and the waste station 60 and it is the part in which the samples are analysed and, after the analysis, discarded. At the interface between the two modules is a sample cup 15, to which samples just taken from the bioreactors or that have undergone manipulations already are delivered before being then routed to the flow cell(s).

The liquid router 10 connects the components in both modules and it may assume different forms in each module. In particular, the liquid router 10 may comprises a liquid handling robot capable of automated pipetting and a system of tubes and pumps. In the bioreactor module the liquid router 10 is in the form of the liquid handling robot and in the analysis module the liquid router 10 is in the form of pumped lines, as shown in FIG. 2. The liquid handling robot may comprise at least one arm that can move with at least three degrees of freedom.

The plurality of sources 20 may be multi-parallel bioreactor units, such as those of Sartorius ambr®. In particular, the ambr® system may comprise the bioreactor module as an integrated unit. As explained in the summary, each bioreactor unit may perform a variation of a production process, such as a cell cultivation process.

Each of the one or more flow cells 30 is configured to contain a biological material sample and let electromagnetic radiation, such as laser, interact with the sample. The result of the interaction is analysed via the electromagnetic radiation spectrum by a spectrometer that is connected to the flow cell 30 via optical fibres. The spectroscopic analysis performed by the spectrometer provides information about the sample of biological material and, thus, on the process occurring in the bioreactor unit from which the sample has been taken. Accordingly, the process can be monitored in real time. The one or more flow cells 30 may be temperature-controlled.

In the simplest scenario, the liquid router 10 takes a plurality of samples, each from one of the sources, and delivers them to the flow cell 30 for spectroscopic analysis. This is done sequentially, i.e. the liquid router 10 takes a first sample and delivers it to the flow cell 30. Once the analysis is completed, the liquid router 10 routes the first sample from the flow cell 30 to the waste station 60 and then draws cleaning liquid from one of the storage stations 50 in which cleaning liquid is stored in order to clean itself and the flow cell 30. Afterwards, the liquid router 10 repeats the same procedure with a second sample and possibly with a third sample and so on.

In particular, the samples may be delivered to the flow cell 30 ensuring that each sample is substantially bubble-free, thereby reducing and/or eliminating the risk of spectral artefacts e.g. caused by air. Exemplarily, the flow cell 30 may be positioned such that gravity supports filling the flow cell and/or emptying the flow cell through the inlet and/or outlet, thereby preventing gas (e.g. air) from being trapped within the flow cell, particularly in an area adjacent to one or more transparent substrates (e.g. windows) used to perform the spectroscopic measurement.

Figure 9A:
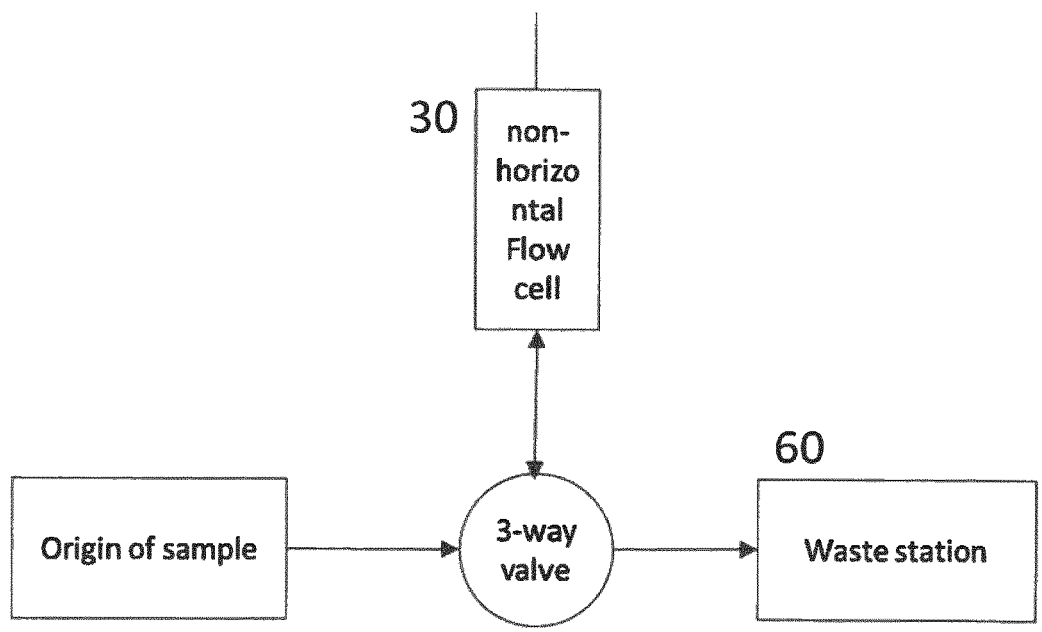
FIGS. 9a and 9b show exemplary methods of sample delivery to a flow cell.
Figure 9B:
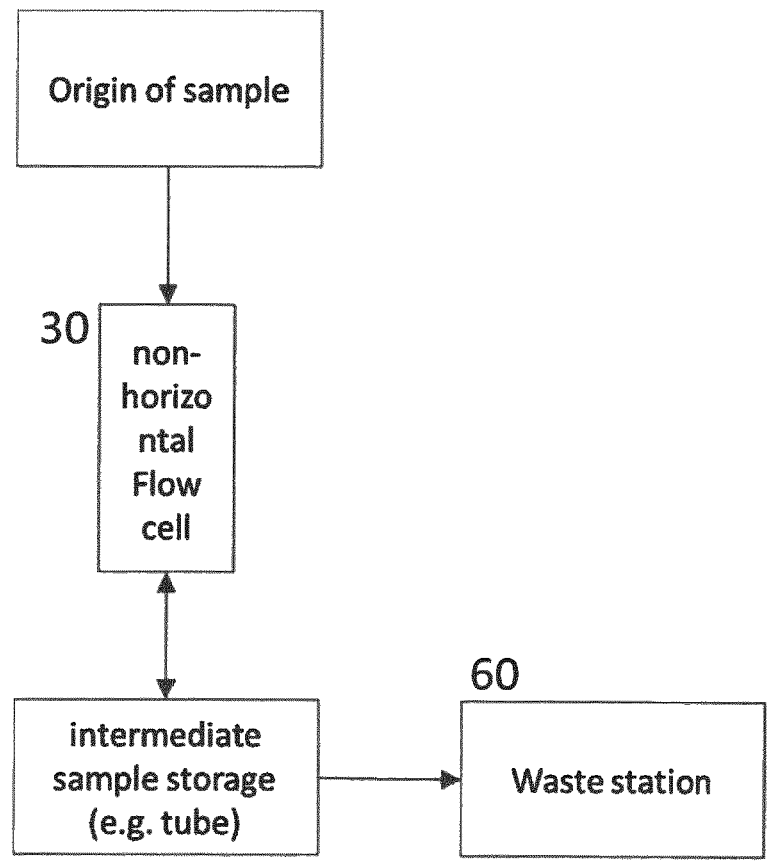

FIGS. 9a and 9b show two exemplary methods of sample delivery to the flow cell 30 that reduce/eliminate the presence of air. In the method of FIG. 9a, the liquid router 30 particularly comprises a valve, which is at least a three-way valve, positioned between the origin of the sample (e.g. one of the sources 20 and/or the sample cup 15), the flow cell 30 and a further destination, e.g. the waste station 60. The flow cell 30 substantially is arranged or positioned in a non-horizontal position with respect to the ground or gravity. The three-way valve may have a first setting, in which it allows passage of liquid between the origin of the sample and the flow cell 30, and a second setting, in which it allows passage of liquid between the flow cell 30 and the waste station 60. Accordingly, the valve may be set to the first setting in order to fill the flow cell 30 with the sample and, after the spectroscopic measurement is performed, the valve may switch to the second setting, enabling delivery of the sample to the waste station 60. In this example, both the origin of the sample and the further destination are connected with the same opening, the bottom opening, of the flow cell 30.

In the method of FIG. 9b, the origin of the sample is connected with the top opening of the flow cell 30, while the bottom opening of the flow cell 30 is connected to an intermediate sample storage, such as a tube. The sample may be delivered via the top opening of the flow cell 30, with the origin of the sample being positioned substantially above the flow cell 30. By virtue of gravity, the sample may also at least partly enter the intermediate sample storage placed below the flow cell 30. The flow cell 30 may be finally filled by pushing or pulling/sucking (e.g. by creating an overpressure in the intermediate sample storage and/or by means of a pump, e.g. syringe or peristaltic pump) the (part of the) sample from the intermediate sample storage back to the flow cell 30. After the spectroscopic measurement, the flow cell 30 may be emptied via the bottom opening in the intermediate sample storage and then the sample may be transferred from the intermediate sample storage to another (e.g. final) destination, such as the waste station 60.

If there is more than one flow cell 30, the liquid router 10 delivers each sample to the plurality of flow cells 30, before moving to the following sample. In particular, the liquid router 10 may deliver the sample sequentially to each flow cell, i.e. one flow cell after the other.

More complex scenarios involve manipulation of the samples of biological material. In one case, the liquid router 10 may deliver a sample to the manipulation station 40 before delivering it to the flow cell(s) 30. At the manipulation station, the sample may be modified for pre-processing purposes and/or disambiguation purposes, as discussed in the summary. A manipulation for pre-processing purposes modifies the sample in order to bring it in the best conditions for the spectroscopic analysis, e.g. to eliminate possible hindrances to the analysis and/or to create favourable conditions for an uncontaminated analysis. A manipulation for disambiguation purposes modifies the sample in order to try and impact the spectral analysis, i.e. the spectrum, so that correlations that are anticipated to be possibly found when interpreting the spectrum may be broken. This is also useful for calibrating a model at the basis of the spectroscopic analysis. The manipulation prior to the analysis may be done for one purpose or both purposes. The liquid router 10 routes the sample from the manipulation station 40 to the flow cell(s) 30 and from there to the waste station 60, as in the simplest scenario.

In another case, the liquid router 10 may deliver the sample to the manipulation station 40 after delivering it to the flow cell(s) 30, i.e. after a first spectroscopic analysis. In this case the manipulation is done only for disambiguation purposes when correlations were predicted, suspected or found in the spectrum of the first spectroscopic analysis, and the sample is routed again to the flow cell(s) 30 for a second spectroscopic analysis. The sample may be then delivered to the waste station 60 or it may undergo other manipulations before that, in a back-and-forth between the manipulation station 40 and the flow cell(s) 30.

Manipulation for disambiguation purposes may be performed by taking a secondary sample from the same source of biological material 20. The liquid router 10 may take a primary sample from a source and determine that it is or is predicted to be ambiguous and then take a secondary sample from that same source and deliver it to the manipulation station 40. The secondary sample may also undergo multiple manipulations before eventually ending at the waste station 60.

Of course pre-analysis and post-analysis manipulations may also be combined.

When a manipulation is performed, the liquid router 10 may draw one or more substances, such as stock solutions, nutrients, water and others, from a corresponding storage station 50 and convey them to the manipulation station 40.

Another scenario involves an off-line reference system 70, which is shown in FIG. 1 but is not part of the automated system 100. The sample for spectroscopic analysis may also undergo an off-line reference analysis at the off-line reference system, wherein the off-line reference analysis may take place simultaneously to the spectroscopic analysis or before and after it, as explained in the summary. In particular, the sample may be split so that the liquid router 10 can deliver a part of it to the flow cell(s) 30 and another part to a transfer container, which is then manually carried to the off-line reference system 70. The transfer container may also be temporarily located in the bioreactor module, so that the liquid handling robot can reach it.

In one example, the analysis module may further comprise a pH probe, which is connected to the sample cup 15 via an alternative tube line with respect to the one leading to the flow cell 30. The pH probe may have no direct role in the spectroscopic analysis. However, the pH measurement may be a beneficial (disambiguating) adjunct to spectroscopy or off-line reference, so the capacity to route the sample to the flow cell 30, and then back to the sample cup 15 and thence to the pH probe (as an alternative workflow to that already described) may be beneficial.

All these scenarios may be combined, so that in one example the sample may undergo pre-analysis and post-analysis manipulations as well as one or more off-line reference analysis.

Figure 3:
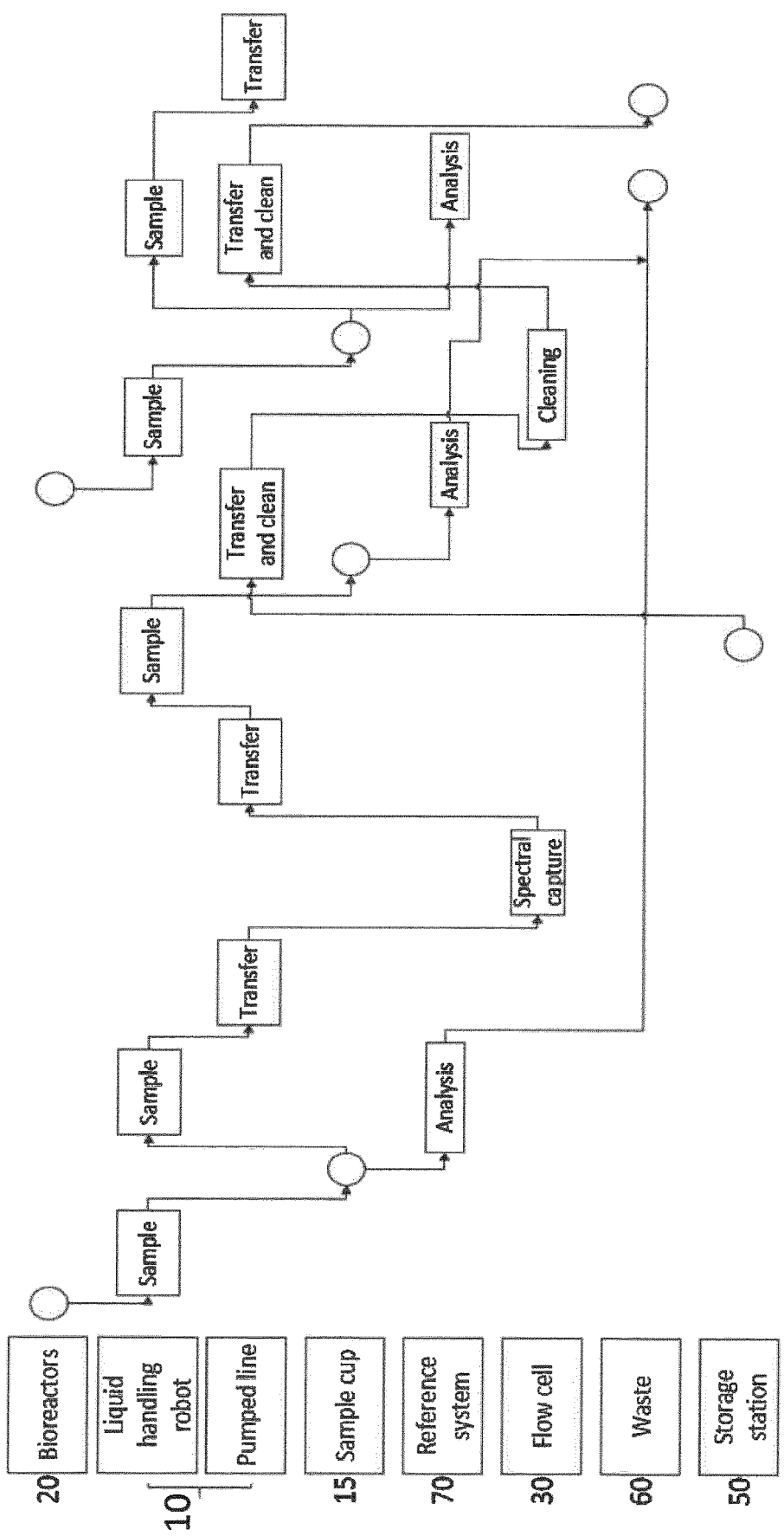
FIG. 3 shows an exemplary workflow of a spectroscopic analysis of biological material.

FIG. 3 shows an exemplary workflow of a spectroscopic analysis of biological material involving some of the illustrated possibilities. In particular, FIG. 3 shows how some steps in the workflow for subsequent samples may be performed simultaneously in order to increase throughput.

At the beginning, the liquid handling robot takes a sample from one of the bioreactors 20 and places it in a transfer container, such as a well plate. A part of the sample, or subsample, is removed from the well plate by the liquid handler while the remainder (another subsample) is taken manually to the off-line reference system 70 for a first off-line reference analysis. The sample is then transferred via the liquid handling robot to the sample cup 15 and from there to the flow cell 30 via the pumped lines. Spectral capture occurs in the flow cell 30 and a spectroscopic analysis is performed by a spectrometer. The sample is transferred back from the analysis module to the bioreactor module, via the pumped lines and then the liquid handling robot, and ends up in the transfer container again. From there, the sample is manually delivered to the off-line reference system 70 for a second off-line reference analysis. In the meantime, the pumped lines transfer cleaning liquid to the flow cell 30 from a storage station 50. Concurrently, the liquid handling robot starts to take the next sample from the bioreactors 20, which is transferred to a well on the well plate, as done before. The liquid handling robot removes part of the sample which will be delivered to the flow cell 30, while the pumped lines get washed and the cleaning liquid is deposited in the waste station 60. The sequence is repeated until all samples have been analysed.

Figure 4:
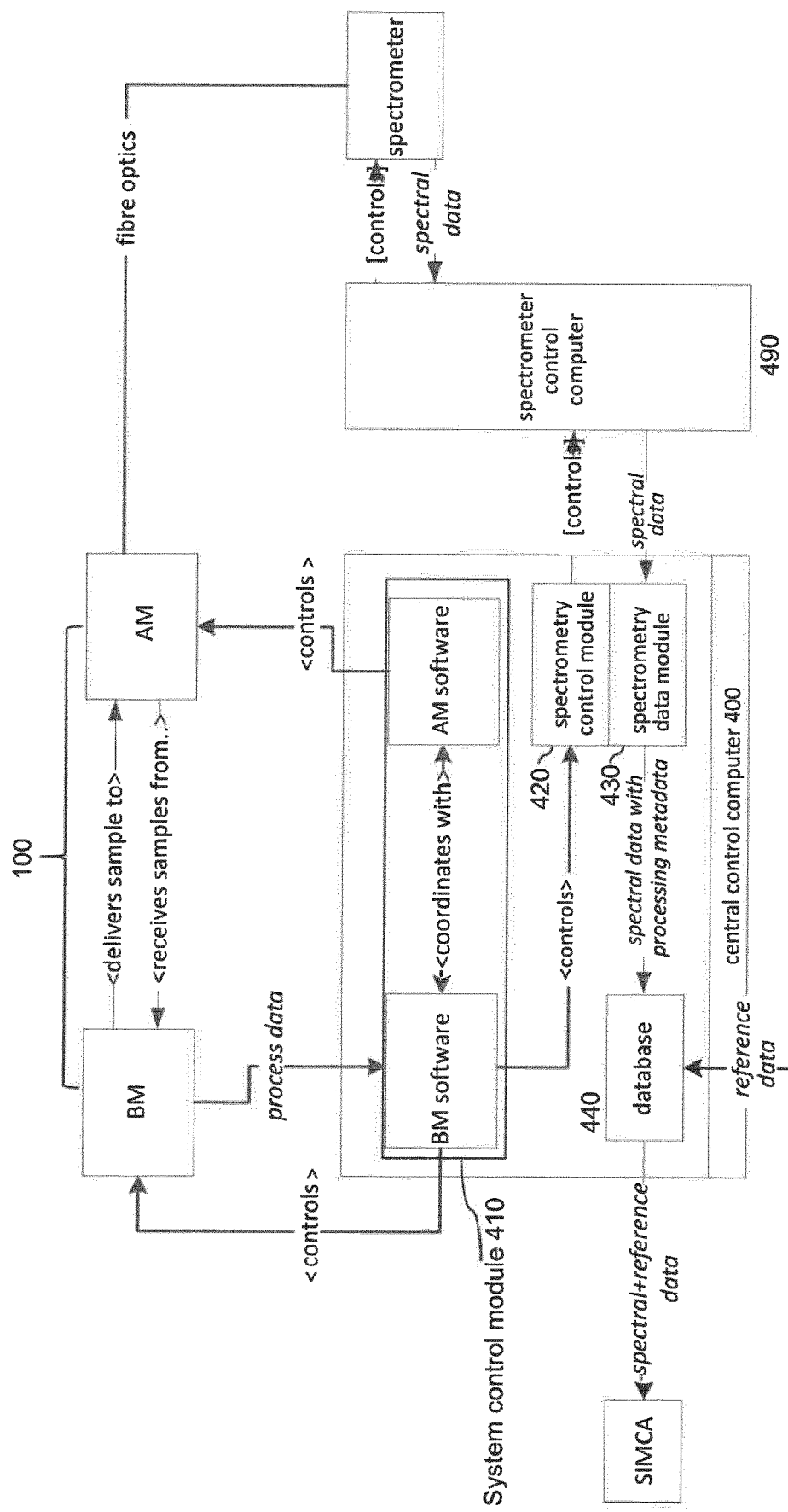
FIG. 4 shows a block diagram of an automated system for spectroscopic analysis of biological material in terms of controlling components.

All the steps discussed with reference to the workflow above, except for the manual transport of the sample to the off-line reference system 70, are performed automatically, in particular the steps carried out by the components of the automated system 100. These components shown in FIGS. 1 and 2 are controlled by a control computer, as shown in FIG. 4.

The central control computer 400 comprises a system control module 410 for controlling the automated system 100, both the bioreactor module and the analysis module. The automated system 100 comprises an interface device for receiving controls from the central control computer 400, and the interface device may also be configured to send process data from the bioreactor module to the central control computer 400. The controls given to the bioreactor module and the analysis module are coordinated.

The central control computer 400 further comprises a spectrometry control module 420 for controlling a spectrometer control computer 490 configured to control one or more spectrometers connected via optical fibres to the one or more flow cells 30 in the analysis module. In addition, the central control computer 400 comprises a spectrometry data module 430 for receiving spectroscopic analysis data from the spectrometer(s) via the spectrometer control computer 490.

The central control computer 400, the automated system 100 and the spectrometer control computer 490 may be part of a network. Communications between the central control computer 400 and the automated system 100 as well as between the central control computer 400 and the spectrometer control computer 490 may occur via data links, e.g. via cable media and/or wireless media.

The central control computer 400 comprises a database 440 into which process data and spectroscopic analysis data are stored, together with reference data coming from the off-line reference analyses. The off-line reference system 70 may also be controlled by an off-line control computer system, which may send the reference data to the central control computer 400 via the Internet. Communications between the off-line control computer system and the central control computer 400 may be secured, e.g. via Internet protocol security (IPSEC) or other security protocols.

The central control computer 400 may send, exemplarily without user intervention, the spectroscopic analysis data and the reference data to a computing device comprising a data analytics module, such as Sartorius-Stedim Data Analytics SIMCA, for elaboration of the data.

Figure 5:
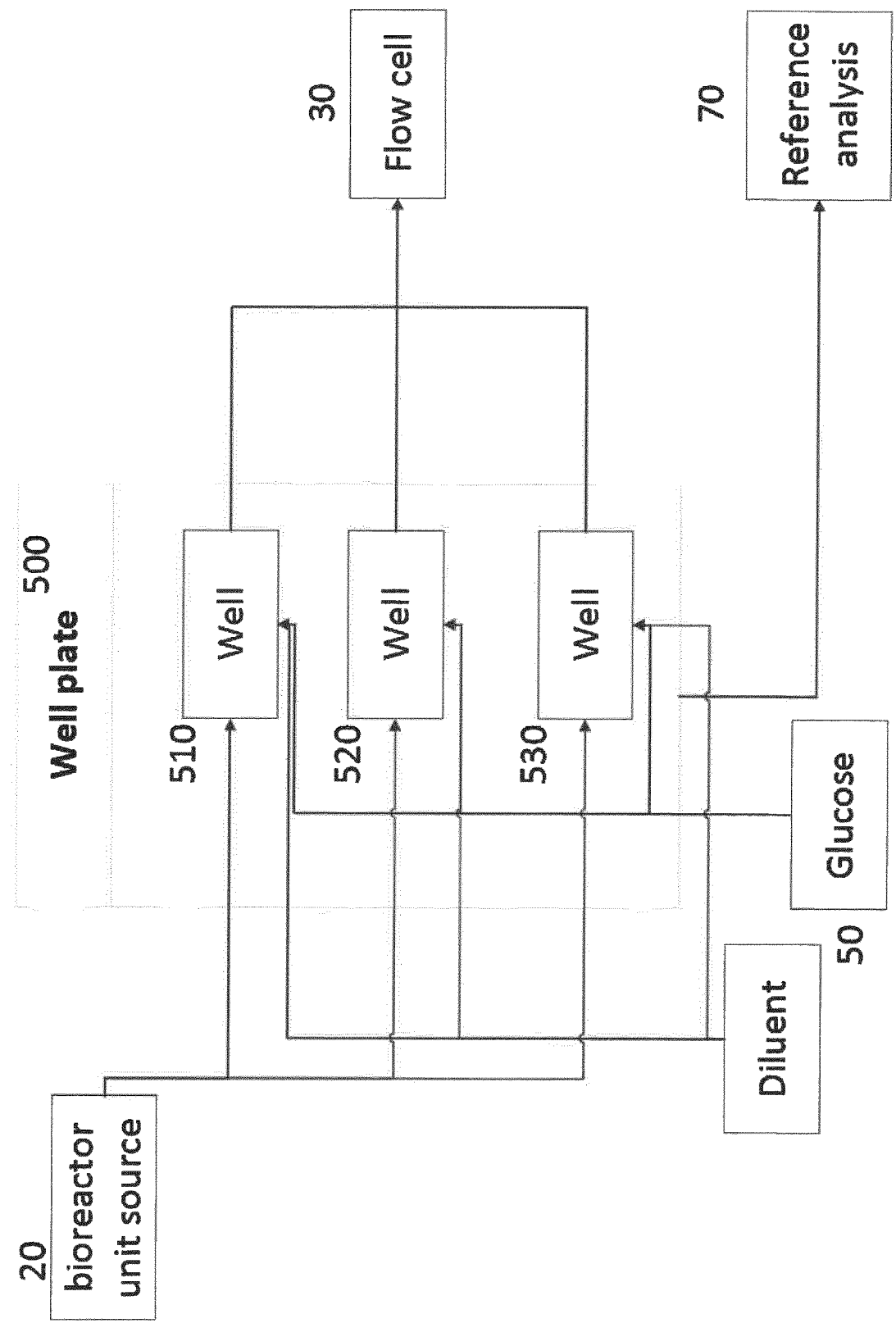
FIG. 5 shows a block diagram of a spiking process.

As mentioned with reference to FIG. 2, the automated system 100 is capable of manipulating samples of biological material. A particular type of manipulation is spiking, i.e. adding a known amount of an analyte to the sample. FIG. 5 shows a block diagram of an exemplary spiking process performed with the aid of well plate comprising at least three wells. A sample is taken by the liquid router 10 from a bioreactor unit source 20 and split into three subsamples delivered respectively to a first well 510, a second well 520 and a third well 530 in a plate 500. The first subsample may be mixed with 100 uL of water, the second subsample may be mixed with 50 uL of water and 50 uL of glucose solution and the third subsample may be mixed with 100 uL of glucose solution. The water and glucose solution may be retrieved by the liquid router 10 from a storage station 50. The liquid router 10 routes the three subsamples to the at least one flow cell 30 sequentially.

Aliquots may be taken from each subsample for the off-line reference system 70, either before spiking or after spiking. If done before spiking, corrections based on the volume and concentration of the spiking solution may be used on the off-line reference analysis results.

FIG. 6 shows an exemplary spiking plate and FIG. 7 shows an exemplary preparation of a spiking plate. The plate shown in FIG. 6 comprises 96 wells, each containing different amounts (including null amounts) of four different disambiguating substances A, B, C, D. In particular, there are 15 different combinations and each combination is repeated six times. Since each well is used only once, this plate may be used for spiking six samples coming from six sources in 15 different ways. Exemplarily, the spiking may be performed according to the standard addition method.

Spiking plate preparation needs to take into account the potential for accumulated inaccuracies due to liquid handling. Therefore, typically, the spiking plate would be produced by a series of liquid handling steps, first to put together stock solution combinations, potentially using a serial dilution approach, and then to aliquot these stock solutions to target wells on the plate. FIG. 7 shows an example thereof: plate is loaded onto system with just the Group A wells filled with stock solution. A plate is also loaded onto the system with a trough of water. Before the analysis starts:

the Group B wells are created by the liquid handling robot by pipetting combinations from the Group A wells;
the Group D wells are created by the liquid handling robot by pipetting combinations from the Group A wells and from the water trough;
the Group C wells are created by the liquid handling robot as aliquots from the Group A wells;
the Group E wells are created by the liquid handling robot as aliquots from the Group B wells;
the Group F wells are created by the liquid handling robot as aliquots from the Group D wells.

Then, during the analysis step, the wells of Groups C, E and F are used for spiking, with a full matrix design for four vessels. This should be treated as an illustrative example, and the exact pattern of plate preparation of spike combinations will depend on the particular experiment to be conducted.

Figure 8:
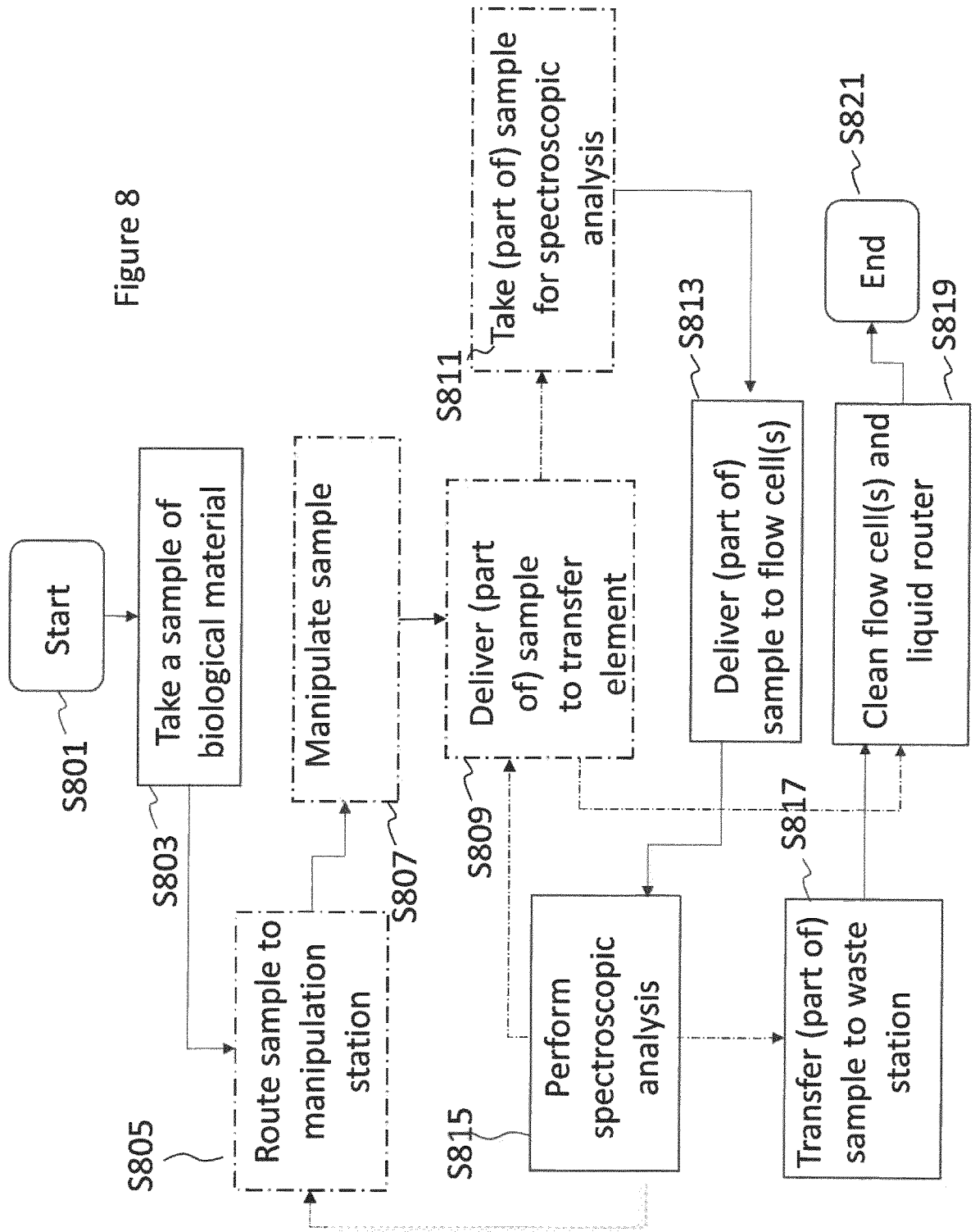
FIG. 8 shows a block diagram of a method for spectroscopic analysis of biological material.

Different possible procedures have been discussed with reference to FIGS. 1 to 7. A non-exhaustive overview of how these procedures may be combined in a protocol is shown in FIG. 8. The block diagram shows a method for spectroscopic analysis of biological material, wherein the dashed-dotted blocks and arrows indicate optional steps. The diagram refers to a single sample of biological material and the method can be repeated for all the plurality of samples of biological material.

The method starts at S801 and it may always (i.e. for each sample) comprise steps S803, S813, S815, S817 and S819 in this order.

Before step S803, the method may comprise (not shown) performing a variation of a production process in a bioreactor unit 20.

At step S803, the sample of biological material is taken from a bioreactor unit 20 by the liquid router 10, in particular by the liquid handling robot.

At step S813 the sample is delivered by the liquid router 10 to the flow cell 30. In particular, the sample coming from the bioreactor module (i.e. from the source, in the simplest case, or from a manipulation station 40) may be delivered by the liquid handling robot to the sample cup 15 and from the sample cup 15 via pumped lines to the flow cell 30.

At step S815, a spectroscopic analysis of the sample is exemplarily performed on the basis of a model by the spectrometer connected to the flow cell 30 via optical fibres. In other examples, the spectroscopic analysis may be performed for data acquisition in order to generate a model for it.

At step S817, once the spectroscopic analysis is completed, pumped lines of the liquid router 10 transfer the sample to the waste station 60.

At step S819, the liquid router 10 draws cleaning liquid from a storage station 50 and washes itself and the flow cell 30.

In more complex situations, the method may further comprise additional steps. Specifically, the method may comprise one or more of the following: pre-processing, pre-analysis disambiguating manipulation, post-analysis disambiguating manipulation, pre-analysis off-line reference analysis, simultaneous off-line reference analysis and post-analysis off-line reference analysis.

Steps S805 and S807 cover pre-processing and pre-analysis disambiguating manipulation when performed before step S815, while covering post-analysis disambiguating manipulation when performed after step S815.

When step S805 is performed right after S803, the sample is routed from the source to the manipulation station 40, where it is manipulated for pre-processing and/or disambiguation (for impacting the spectroscopic analysis), e.g. filtered and/or spiked, at S807. When step S805 is performed after step S815, the sample is routed from the flow cell 30, i.e. from the analysis module, back to the bioreactor module, namely to the manipulation station 40. There, it is manipulated to impact the spectroscopic analysis at S807. Afterwards, the method moves again to step S813, possibly going through steps S809-S811.

Step S809 covers pre-analysis off-line reference analysis, simultaneous off-line reference analysis and post-analysis off-line reference analysis. In particular, when the delivery to the transfer element takes place before the spectroscopic analysis, i.e. S809 is performed before S815, the sample may come from the source or from the manipulation station 40. At the transfer element the sample is split into two parts, one carried manually to the off-line reference system 70 (not shown) and the other taken at S811 by the liquid handling robot, which is then delivered at S813 to the flow cell 30. The spectroscopic analysis and the off-line reference analysis may be coordinated so as to occur simultaneously or the off-line reference analysis may be performed prior to the spectroscopic analysis.

When the delivery to the transfer element takes place after the spectroscopic analysis, i.e. S809 is performed after S815, the sample may be routed from the flow cell 30 to the transfer element, from which it is taken to the off-line reference system 70 for post-analysis off-line or at-line reference analysis. Since the sample has already been used for spectroscopic analysis, there is no need for splitting it into two parts. Further, the flow cell 30 has already been emptied. Accordingly, after S809, the method may directly move to S819.

In light of what described, it is apparent that the method is flexible and can provide performances tailored to the specific sample.

The invention claimed is:

1. A computer-implemented method for spectroscopic analysis of biological material, the method including an analysis step comprising:

taking, by a liquid router, a plurality of samples of biological material from a plurality of sources, wherein each sample of the plurality of samples is taken from a source of the plurality of sources;

delivering, by the liquid router, the plurality of samples of biological material to at least one flow cell for spectroscopy;

performing, by at least one spectrometer connected to the at least one flow cell, the spectroscopic analysis of the plurality of samples of biological material;

determining whether the spectroscopic analysis for each sample of the plurality of samples is or is predicted to be ambiguous in that it is affected by at least two non-discriminable factors being temporally correlated; and upon determining that the spectroscopic analysis for a given sample of the plurality of samples of biological material is or is predicted to be ambiguous, performing a first disambiguating step or a second disambiguating step to break the correlation of the at least two non-discriminable factors, the disambiguating step, wherein the first disambiguating step comprises taking, by the liquid router, the given sample of biological material from the at least one flow cell to a manipulation station;

manipulating, at the manipulation station, the given sample of biological material in order to impact the spectroscopic analysis;

delivering, by the liquid router, the given manipulated sample of biological material from the manipulation station to the at least one flow cell; and performing, by the at least one spectrometer, the spectroscopic analysis of the given manipulated sample of biological material;

wherein the second disambiguating step comprises taking, by the liquid router, a secondary sample of biological material from the same source of the given sample for which the spectroscopic analysis is or is predicted to be ambiguous;

routing, by the liquid router, the secondary sample of biological material from the source to a manipulation station;

manipulating, at the manipulation station, the secondary sample of biological material in order to impact the spectroscopic analysis;

delivering, by the liquid router, the manipulated secondary sample of biological material from the manipulation station to the at least one flow cell; and performing, by the at least one spectrometer, the spectroscopic analysis of the manipulated secondary sample of biological material;

wherein information obtained via the disambiguating step with the secondary sample is used for the spectroscopic analysis of the given sample.

2. The method according to claim 1, wherein each source of the plurality of sources is a bioreactor.

3. The method according to claim 1, wherein manipulating the given sample or the secondary sample of biological material comprises mixing the sample of biological material with a disambiguating substance.

4. The method according to claim 3, wherein:

manipulating the given sample or the secondary sample of biological material further comprises dividing the given sample or the secondary sample of biological material in a plurality of subsamples and each subsample is mixed with a different amount of the disambiguating substance and/or one or more of a range of other disambiguating substances;

delivering the given manipulated sample or manipulated secondary sample comprises delivering the plurality of manipulated subsamples; and performing the spectroscopic analysis of the given manipulated sample or manipulated secondary sample comprises performing the spectroscopic analysis of the plurality of manipulated subsamples.

5. The method according to claim 1, wherein delivering, by the liquid router, the plurality of samples of biological material to at least one flow cell for spectroscopy comprises delivering the plurality of samples of biological material to a plurality of flow cells.

6. The method according to claim 1, further comprising:

pre-processing at least one sample of the plurality of samples of biological material, prior to performing the spectroscopic analysis, by at least one of: filtering, heating, normalizing pH, modifying ionic strength, diluting, metabolic inactivation.

7. The method according to claim 1 further comprising:

taking, by the liquid router, a subsample of at least one sample of the plurality of samples of biological material for a reference system;

performing, by the reference system, a reference analysis of the subsample;

comparing a result of the spectroscopic analysis by the spectrometer for the at least one sample of biological material with a result of the reference analysis.

8. The method according to claim 1, wherein the step of performing the spectroscopic analysis is performed at a plurality of different time points, the method further comprising:

determining a time-based profile of results of the spectroscopic analysis.

9. The method according to claim 1, further comprising performing variations of a production process in the plurality of sources.

10. The method according to claim 1, wherein the steps of the method are part of a protocol that is automatically executed.

11. A system for spectroscopic analysis of biological material, the system comprising:

a plurality of sources of biological material;
a liquid router;
at least one flow cell;
a manipulation station; and
an interface device; wherein:

the interface device is configured to receive instructions for automatically controlling operations of the system;

the liquid router is configured to take a plurality of samples of biological material from the plurality of sources, wherein each sample of the plurality of samples is taken from a source of the plurality of sources, and to deliver the plurality of samples of biological material to the at least one flow cell;

the at least one flow cell is configured to be connected to at least one spectrometer; and when a spectroscopic analysis of a given sample of the plurality of samples of biological material by the at least one spectrometer is or is predicted to be ambiguous in that the spectroscopic analysis is affected by at least two non-discriminable factors being temporally correlated, wherein the liquid router is configured in a first or second configuration, wherein in the first configuration the liquid router is configured to:

route the given sample of biological material from the at least one flow cell to the manipulation station, wherein the manipulation station is configured so that the given sample of biological material is manipulated in order to impact the spectroscopic analysis; and deliver the given manipulated sample of biological material from the manipulation station to the at least one flow cell;

wherein in the second configuration the liquid router is configured to:

take a secondary sample of biological material from the same source of the given sample for which the spectroscopic analysis is or is predicted to be ambiguous;

route the secondary sample of biological material from the source to a manipulation station, wherein the manipulation station is configured so that the secondary sample of biological material is manipulated in order to impact the spectroscopic analysis; and deliver the manipulated secondary sample of biological material from the manipulation station to the at least one flow cell, wherein information obtained with the secondary sample is used for the spectroscopic analysis of the given sample.

12. The system according to claim 11, wherein:

the liquid router is further configured, prior to the spectroscopic analysis, to route at least one sample of the plurality of samples of biological material to the manipulation station for pre-processing; and the manipulation station is configured such that the at least one sample of biological material is pre-processed prior to the spectroscopic analysis by at least one of filtering, heating, normalizing pH, modifying ionic strength, diluting, and metabolic inactivation.

13. The system according to claim 11, wherein the system is configured to be connected to a computing device, wherein:

the liquid router is further configured to take a subsample of at least one sample of the plurality of samples of biological material for a reference system;

the reference system is configured to perform a reference analysis of the subsample; and the computing device is configured to compare a result of the spectroscopic analysis of the at least one sample of biological material by the at least one spectrometer with a result of the reference analysis.

14. The system according to claim 11, wherein the liquid router comprises a liquid handling robot that performs automated pipetting being operable to be controlled via the interface device.

15. A computer program product comprising a non-transitory computer readable medium storing computer-readable instructions which, when loaded and executed on a suitable system, perform the steps of a method according to claim 1.

\* \* \* \* \*